US010921039B2

United States Patent
Woo et al.

(10) Patent No.: US 10,921,039 B2
(45) Date of Patent: Feb. 16, 2021

(54) FOOD STORAGE APPARATUS AND CONTROL METHOD THEREOF

(71) Applicant: Samsung Electronics Co., Ltd., Suwon-si (KR)

(72) Inventors: Ji-young Woo, Incheon (KR); Eun-jae Lee, Incheon (KR); Garret Miller, Mountain View, CA (US); Kristen Kator, Mountain View, CA (US); Rob Thomas, Seattle, WA (US); Hae-ri Lee, Seoul (KR); Adnan Agboatwalla, Mountain View, CA (US); Andy Wu, Mountain View, CA (US); Robert Mori, Mountain View, CA (US); Sung-youn Kim, Yongin-si (KR); Han-min Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 76 days.

(21) Appl. No.: 15/861,345

(22) Filed: Jan. 3, 2018

(65) Prior Publication Data
US 2018/0187943 A1    Jul. 5, 2018

Related U.S. Application Data

(60) Provisional application No. 62/441,806, filed on Jan. 3, 2017.

(30) Foreign Application Priority Data

Dec. 21, 2017    (KR) .................. 10-2017-0177311

(51) Int. Cl.
*F25D 11/02* (2006.01)
*G06Q 10/04* (2012.01)
(Continued)

(52) U.S. Cl.
CPC .............. *F25D 11/02* (2013.01); *F25D 23/02* (2013.01); *F25D 29/005* (2013.01);
(Continued)

(58) Field of Classification Search
CPC .............................. F25D 29/005; F25D 11/02
See application file for complete search history.

(56) References Cited

U.S. PATENT DOCUMENTS 8,816,828 B2    8/2014 Ebrom et al.
8,994,678 B2    3/2015 Sawhney et al.
(Continued)

FOREIGN PATENT DOCUMENTS

AU    2013203020 A1    12/2013
CN    1375674 A        10/2002
(Continued)

OTHER PUBLICATIONS

Extended European Search Report dated Mar. 26, 2018, in corresponding European Patent Application No. 18150212.1, 7 pgs.
(Continued)

*Primary Examiner* — Elizabeth J Martin
*Assistant Examiner* — Nael N Babaa
(74) *Attorney, Agent, or Firm* — Staas & Halsey LLP

(57) ABSTRACT

A food storage apparatus and a control method thereof are provided. The food storage apparatus includes a display; and a processor configured to control the display to display a user interface (UI) including one or more icons for controlling a execution screen of a application on a side region of the execution screen of the application while the execution screen of the application is displayed, wherein the application a view inside application providing an image obtained by photographing the inside of the food storage apparatus, and the processor controls the display to display the UI on the image obtained by photographing the inside of the food
(Continued)

storage apparatus. Accordingly, the food storage apparatus may provide various services as compared to the conventional food storage apparatus, and may provide the UI for the service execution in the form that the user may easily and rapidly use the UI.

17 Claims, 23 Drawing Sheets

(51) Int. Cl.
    *G06Q 10/08*     (2012.01)
    *G06Q 30/06*     (2012.01)
    *F25D 23/02*     (2006.01)
    *F25D 29/00*     (2006.01)
    *G06F 3/0362*     (2013.01)
    *G06F 3/0488*     (2013.01)

(52) U.S. Cl.
    CPC .......... *G06F 3/0362* (2013.01); *G06F 3/0488* (2013.01); *G06Q 10/04* (2013.01); *G06Q 10/08* (2013.01); *G06Q 30/0601* (2013.01); *F25D 2400/361* (2013.01); *F25D 2700/02* (2013.01); *F25D 2700/12* (2013.01)

(56) References Cited

U.S. PATENT DOCUMENTS

| | | | |
|---|---|---|---|
| 9,074,806 | B2 | 7/2015 | Cheon et al. |
| 9,449,208 | B2 | 9/2016 | Luk et al. |
| 2006/0224401 | A1 | 10/2006 | Hunt |
| 2014/0003667 | A1 | 1/2014 | Fukuchi et al. |
| 2014/0074649 | A1 | 3/2014 | Patel et al. |
| 2014/0295822 | A1 | 10/2014 | Koo et al. |
| 2015/0267960 | A1 | 9/2015 | Cheon et al. |
| 2015/0339524 | A1 | 11/2015 | Yang et al. |
| 2016/0065509 | A1 | 3/2016 | Yang et al. |
| 2016/0065525 | A1 | 3/2016 | Dye et al. |
| 2016/0080298 | A1* | 3/2016 | Oh .......................... H04L 51/10 709/206 |
| 2016/0088262 | A1 | 3/2016 | Lee et al. |
| 2016/0123657 | A1* | 5/2016 | Kim ........................ F25D 29/00 62/125 |
| 2016/0227010 | A1 | 8/2016 | Jung et al. |
| 2017/0186079 | A1* | 6/2017 | Kim ...................... G06F 3/0488 |
| 2018/0266751 | A1* | 9/2018 | Lim .................... G06Q 10/0875 |

FOREIGN PATENT DOCUMENTS

| | | |
|---|---|---|
| CN | 101356493 A | 1/2009 |
| CN | 102032740 A | 4/2011 |
| CN | 104361041 A | 2/2015 |
| CN | 104949447 A | 9/2015 |
| CN | 105008833 A | 10/2015 |
| CN | 105164481 A | 12/2015 |
| CN | 105758091 A | 7/2016 |
| EP | 2 985 553 | 2/2016 |
| JP | 10-9753 | 1/1998 |
| JP | 2002-243335 | 8/2002 |
| JP | 2002-267337 | 9/2002 |
| JP | 2005-202696 | 7/2005 |
| JP | 2011-203932 | 10/2011 |
| JP | 2012-181797 | 9/2012 |
| JP | 2012-193873 | 10/2012 |
| JP | 5773948 | 9/2015 |
| JP | 2015-222138 | 12/2015 |
| KR | 10-0424316 | 3/2004 |
| KR | 10-2012-0109151 | 10/2012 |
| KR | 10-2012-0116207 | 10/2012 |
| KR | 10-2013-0015512 | 2/2013 |
| KR | 10-2014-0011250 | 1/2014 |
| KR | 10-2014-0095098 | 7/2014 |
| KR | 10-2015-0028007 | 3/2015 |
| KR | 10-2015-0118864 | 10/2015 |
| KR | 10-2015-0124155 | 11/2015 |
| KR | 10-2015-0127013 | 11/2015 |
| KR | 10-2015-0135056 | 12/2015 |
| KR | 10-2016-0003211 | 1/2016 |
| KR | 10-2016-0058438 | 5/2016 |
| WO | WO 2008/030779 A2 | 3/2008 |
| WO | 2014/168265 | 10/2014 |
| WO | WO 2014/175643 A1 | 10/2014 |

OTHER PUBLICATIONS

European Patent Office issued Communication pursuant to Article 94(3) EPC in European Patent Application No. 18 150 212.1 dated Oct. 9, 2018 (5 pages).
European Summons to Oral Proceedings dated Mar. 15, 2019 in corresponding European Patent Application No. 181502121 (64 pages).
Korean Office Action dated Jan. 30, 2019 in corresponding Korean Patent Application No. 10-2017-0177311 (5 pages).
Chinese Office Action dated Oct. 14, 2019 in corresponding Chinese Patent Application No. 201810004774.X.
European Communication dated Jan. 24, 2020 in European Patent Application No. 181502121.
European Office Action dated May 14, 2020, in corresponding European Patent Application 18150212.1.
Extended European Search Report dated Dec. 8, 2020 in European Patent Application No. 20187759.4.

\* cited by examiner

FIG. 11A
FIG. 11B
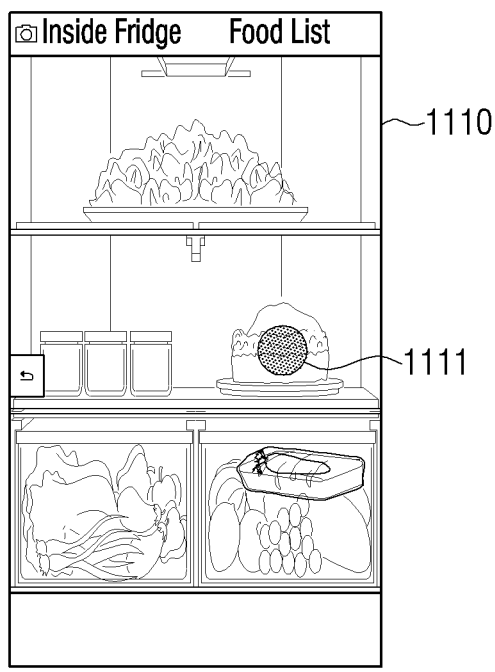
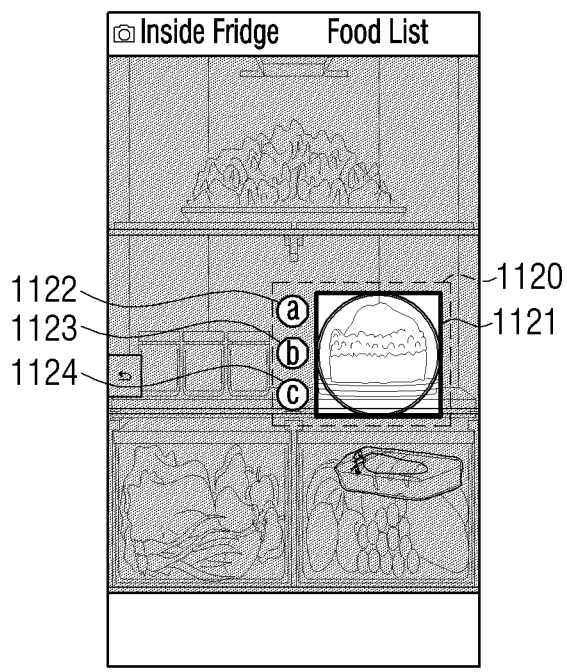

FOOD STORAGE APPARATUS AND CONTROL METHOD THEREOF

CROSS-REFERENCE TO RELATED APPLICATIONS

This application claims priority from Korean Patent Application No. 10-2017-0177311, filed on Dec. 21, 2017, in the Korean Intellectual Patent Office, and U.S. Provisional Patent Application No. 62/441,806, filed on Jan. 3, 2017, in the United States Patents and Trademark Office, the disclosures of which are incorporated herein by references in their entirety.

BACKGROUND OF THE INVENTION

Field of the Invention

Apparatuses and methods consistent with the present disclosure relate to a food storage apparatus and a control method thereof, and more particularly, to a food storage apparatus for providing various user interface (UI) environments through the food storage apparatus, and a control method thereof.

Description of the Related Art

In accordance with a recent technology development, a food storage apparatus such as a smart refrigerator may provide information related to foods stored in the food storage apparatus.

Further, the food storage apparatus may communicate with an external device or an external server to provide various contents.

For example, the food storage apparatus provides a storable state of the foods stored in the food storage apparatus and cooking information using the stored foods through a display screen attached onto a front surface of a door that opens and closes a chamber in which the foods are stored, or provides only a service such as a playback of contents received from the outside.

That is, the conventional food storage apparatus provides a service which is more or less restrictive, using information input from a user, information sensed in the food storage apparatus, data received from the outside, and the like.

Meanwhile, the food storage apparatus may display a user interface (UI) through the display screen, and may provide the above-mentioned service according to a selection command of the user for the displayed UI.

The UI for providing such a service is displayed to be disposed at an upper end or a lower end of the display screen, or to be disposed at the center of the display screen.

In a case in which the UI for providing the above-mentioned service is disposed at the upper end or the lower end of the display screen, a specific user (e.g., a taller or shorter user, or a disabled person) may not easily operate the UI displayed on the display screen.

Further, in a case in which the corresponding UI is disposed at the center of the display screen, the user should accept inconvenience to watch an execution screen of various applications or the contents such as a video image which are displayed through the display screen due to the UI displayed at the center of the display screen.

SUMMARY OF THE INVENTION

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides various services using various information received or input from a food storage apparatus.

Further, the present disclosure provides a user interface (UI) for a service execution in a form that a user may easily and rapidly use the UI.

According to an aspect of the present disclosure, a food storage apparatus includes a display configured to display an execution screen of an application related to the food storage apparatus; and a processor configured to control the display to display a user interface (UI) including one or more icons for controlling the execution screen of the application on a side region of the execution screen of the application while the execution screen of the application is displayed, wherein the application provides an image obtained by photographing the inside of the food storage apparatus, and the processor controls the display to display the UI on the image obtained by photographing the inside of the food storage apparatus.

When one of one or more icons is selected, the processor may display an execution screen corresponding to the selected icon, and control the display to display a sub UI including an icon for controlling the displayed execution screen.

The processor may control the display to further display a guide UI guiding a movable range of the UI.

When one of a plurality of objects included in the photographed image is selected, the processor may control the display to display an input UI for inputting information related to the selected object.

When a first icon included in the input UI is selected, the processor may display a memo UI for inputting the information related to the object, and when a user command is received through the memo UI, the processor may control the display to generate a tag UI including a memo corresponding to the user command, overlap the tag UI with the photographed image, and display the overlapped tag UI.

When the tag UI is selected, the processor may again display the memo UI for inputting information related to an object corresponding to the selected tag UI.

When a second icon included in the input UI is selected, the processor may execute a food list application for providing food information for each of the foods stored in the food storage apparatus, and when the food information related to the object is received, the processor may register the received food information with a food list stored in the executed food list application.

When a third icon included in the input UI is selected, the processor may execute a shopping list application for purchasing the food, and when food information related to the object is received, the processor may register the received food information with a shopping list stored in the shopping list application.

When a voice command for purchasing the food is received, the processor may execute a shopping list application, and register food information related to the voice command with a shopping list stored in the executed shopping list application.

When a user command for a specific cooking is received in a state in which a recipe application for guiding a recipe for each cooking is executed, the processor may display ingredient information for the cooking, and control the display to differently display ingredients related to the foods which are in the food storage apparatus among the displayed ingredients and the remaining ingredients based on a food list stored in a food list application providing food information for the foods stored in the food storage apparatus.

According to another aspect of the present disclosure, a control method of a food storage apparatus includes displaying an execution screen of an application related to the food storage apparatus; and displaying a user interface (UI) including one or more icons for controlling the execution screen of the application on a side region of the execution screen of the application while the execution screen of the application is displayed, wherein the application provides an image obtained by photographing the inside of the food storage apparatus, and in the displaying of the UI on the side region, the UI is displayed on the image obtained by photographing the inside of the food storage apparatus.

In the displaying of the execution screen of the application, when one of one or more icons is selected, an execution screen corresponding to the selected icon may be displayed, and in the displaying of the UI on the side region, a sub UI including an icon for controlling the displayed execution screen may be displayed.

The control method may further include displaying a guide UI guiding a movable range of the UI.

The control method may further include, when one of a plurality of objects included in the photographed image is selected, displaying an input UI for inputting information related to the selected object.

The control method may further include displaying a tag UI according to a user command which is received through the input UI, wherein the displaying of the tag UI may include: when a first icon included in the input UI is selected, displaying a memo UI for inputting the information related to the selected object, when a user command is received through the memo UI, generating a tag UI including a memo corresponding to the user command; and overlapping the generated tag UI with the photographed image, and displaying the overlapped tag UI.

In the displaying of the tag UI, when the tag UI is selected, the memo UI for inputting information related to an object corresponding to the selected tag UI may be again displayed.

The control method may further include registering information on the foods stored in the food storage apparatus according to the user command which is received through the input UI, wherein the registering of the information on the foods may include: when a second icon included in the input UI is selected, executing a food list application for providing food information for each of the foods stored in the food storage apparatus, and when the food information related to the object is received, registering the received food information with the food list stored in the food list application, and the food list is to provide information on the foods stored in the food storage apparatus.

The control method may further include registering information for purchasing the food according to the user command which is received through the input UI, wherein the registering of the information for purchasing the food may include when a third icon included in the input UI is selected, executing a shopping list application for purchasing the food, and when food information related to the object is received, registering the received food information with the shopping list stored in the shopping list application.

The control method may further include registering food information, wherein in the registering of the food information, when a voice command for purchasing the food is received, a shopping list application is executed, and food information related to the voice command is registered with a shopping list stored in the executed shopping list application.

In the displaying of the execution screen of the application, when a user command for a specific cooking is received in a state in which a recipe application for guiding a recipe for each cooking is executed, ingredient information for the cooking may be displayed, and ingredients related to the foods which are in the food storage apparatus among the displayed ingredients and the remaining ingredients may be differently displayed based on a food list stored in a food list application providing food information for the foods stored in the food storage apparatus.

As described above, the food storage apparatus according to the present disclosure may provide various services as compared to the conventional food storage apparatus, and may provide the UI for the service execution in the form that the user may easily and rapidly use the UI.

BRIEF DESCRIPTION OF THE DRAWING FIGURES

The above and/or other aspects of the present disclosure will be more apparent by describing certain exemplary embodiments of the present disclosure with reference to the accompanying drawings, in which:

FIGS. 11A to 15C are illustrative views illustrating an execution operation of a view inside application in the food storage apparatus according to an exemplary embodiment of the present disclosure;

DETAILED DESCRIPTION OF THE EXEMPLARY EMBODIMENTS

Figure 1:
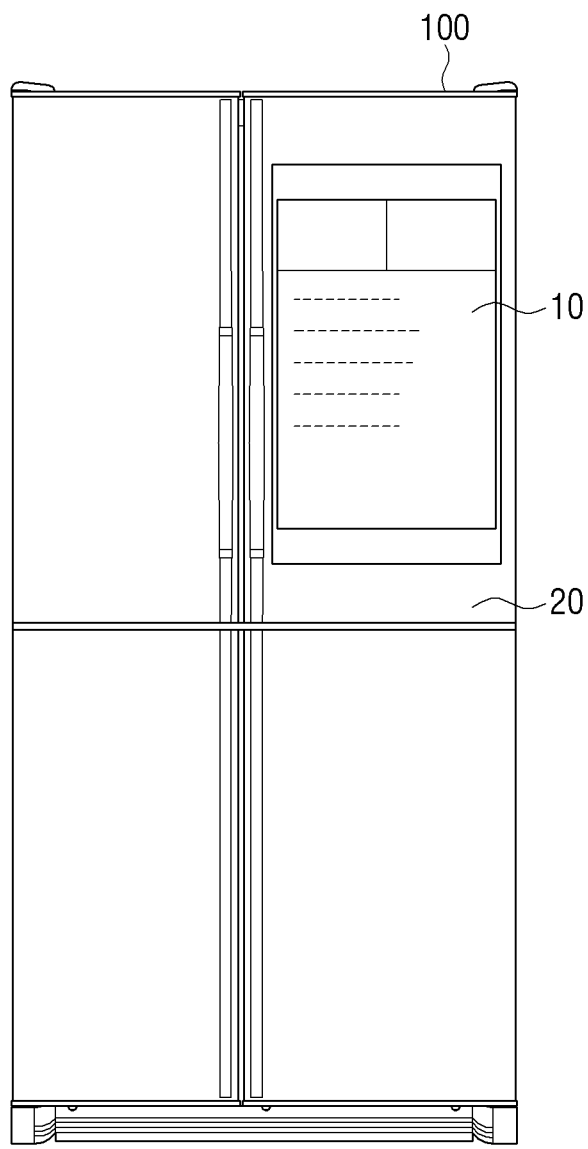
FIG. 1 is an illustrative view of a food storage apparatus according to an exemplary embodiment of the present disclosure.

Terms used in the present specification will be briefly described and the present disclosure will be described in detail.

As the terms used in the exemplary embodiments of the present disclosure, general terms which are currently used as widely possible as are selected, but may be varied depending on an intention of those skilled in the art, a practice, an emergence of new technologies, and the like. In addition, in a certain case, there are terms which are arbitrarily selected by an applicant, and in this case, a meaning thereof will be described in detail in a description part of the disclosure corresponding to the terms. Therefore, the terms used in the present disclosure should be defined based on the meanings of the terms and the contents throughout the present disclosure, not simple names of the terms.

Exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. In describing the exemplary embodiments, when it is determined that a specific description of known technologies would obscure the gist of the present disclosure, a detailed description thereof will be omitted.

Terms such as first, second, etc. can be used to describe various components, but the components should not be limited to the terms. The terms are only used to distinguish one component from the others.

As used herein, the singular forms are intended to include plural forms as well, unless the context clearly indicates otherwise. In the present application, the terms "include" or "consist of" intend to designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present disclosure, a 'module' or a 'unit' performs at least one function or operation, and may be implemented in hardware, software, or a combination of hardware and software. In addition, a plurality of 'modules' or a plurality of 'units' may be integrated into at least one module and may be implemented in at least one processor (not shown), except for a 'module' or a 'unit' in which they need to be implemented in specific hardware.

In the exemplary embodiment of the present disclosure, a case in which any one part is "connected" with the other part includes a case in which the parts are "directly connected" with each other and a case in which the parts are "electrically connected" with each other having other elements interposed therebetween. In addition, a case in which any one part is "connected" with the other part includes a physical connection as well as a wireless connection. In addition, unless explicitly described to the contrary, "comprising" any components will be understood to imply the inclusion of other elements rather than the exclusion of any other elements.

Hereinafter, embodiments of the present disclosure will be described in detail with reference to the accompanying drawings so that those skilled in the art may easily practice the present disclosure. However, the present disclosure may be implemented in various different ways and is not limited to the embodiments provided in the present description. In the accompanying drawings, portions unrelated to the description will be omitted in order to obviously describe the present disclosure, and similar reference numerals will be used to describe similar portions throughout the present specification.

Hereinafter, the present disclosure will be described in detail with reference to the accompanying drawings.

FIG. 1 is an illustrative view of a food storage apparatus according to an exemplary embodiment of the present disclosure.

As illustrated in FIG. 1, a food storage apparatus 100 may be an apparatus in which the food may be stored so as not to go bad, such as a smart refrigerator.

Such a food storage apparatus 100 displays an execution screen for various application related to the food or provides user interfaces (UI) for execution of the respective applications through a display screen 20 attached onto a front surface of a door 10 that opens and closes a chamber in which the food is stored.

Here, the application may be an application providing an image obtained by photographing the inside of the food storage apparatus 100. That is, the applications related to the food may be a view inside application for providing the image obtained by photographing the inside of the food storage apparatus 100 in which the food is stored, an application for purchasing the food, an application for providing a recipe for each cooking, and the like.

Further, the food storage apparatus 100 may display an execution screen for various applications such as life information, the contents, a schedule management, a memo, and the like, or provide the UI including one or more icons for execution of the respective applications through the display screen 20.

Meanwhile, the food storage apparatus 100 may display an UI including one or more icons for executing the application or controlling the execution screen of the application on a side of the display screen 20.

As such, as the UI including one or more icons for executing the application or controlling the execution screen of the application is displayed on the side of the display screen 20, a problem that the execution screen of the application displayed on the display screen 20 is disturbed by the corresponding UI may be solved.

Further, as the UI including one or more icons for executing the application or controlling the execution screen of the application is displayed on the side of the display screen 20, all users may use the UI displayed on the display screen 20.

Meanwhile, the food storage apparatus 100 may move the UI including one or more icons displayed on the side region of the display screen 20 in a direction corresponding to a user command.

For example, the food storage apparatus 100 may move the UI including one or more icons displayed on the side region of the display screen 20 in an upper direction or a lower direction according to the user command.

Hereinabove, the food storage apparatus 100 according to the present disclosure has been briefly described. Hereinafter, a configuration of the food storage apparatus 100 according to the present disclosure will be described in detail.

Figure 2:
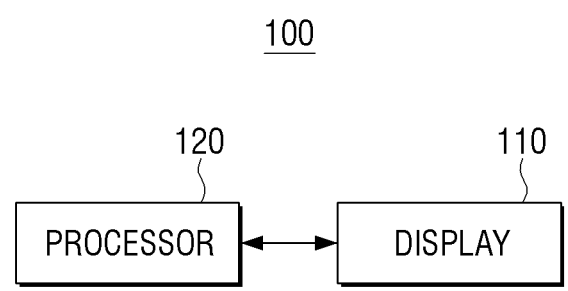
FIG. 2 is a schematic block diagram of the food storage apparatus according to an exemplary embodiment of the present disclosure.

FIG. 2 is a schematic block diagram of the food storage apparatus according to an exemplary embodiment of the present disclosure.

As illustrated in FIG. 2, the food storage apparatus 100 includes a display 110 and a processor 120.

The display 110 displays an execution screen of the application related to the food storage apparatus 100.

Here, the application related to the food storage apparatus 100 may be a view inside application for providing an image obtained by photographing the inside of the food storage apparatus 100 in which the food is stored. However, the present disclosure is not limited thereto, and the application related to the food storage apparatus 100 may include an application for purchasing the food and an application for providing a recipe for each cooking.

Further, the application provided from the food storage apparatus 100 may include life information, the contents, a schedule management, and a memo related application.

The processor 120 controls the display 110 to display the UI including one or more icons for controlling the execution screen of the application on the side region of the execution screen of the application which is being displayed, while the execution screen of the application is displayed on the display 110.

Accordingly, the display 110 may display the UI including one or more icons for controlling the execution screen of the application on the side region of the execution screen of the application which is being displayed.

Meanwhile, when one of one or more icons included in the UI displayed on the side region of the execution screen of the application is selected, the processor 120 displays an execution screen corresponding to the selected icon, and controls the display 110 to display a sub UI including an icon for controlling the displayed execution screen.

In this case, the processor 120 may control the display 110 to display the sub UI on the side region of the displayed execution screen.

According to an exemplary embodiment, the processor 120 may control the display 110 to display the sub UI to be overlapped on the side region of the displayed execution screen.

According to another exemplary embodiment, the processor 120 may control the display 110 to display the sub UI on the side region and to display the execution screen on the remaining region.

According to a further aspect of the present disclosure, the processor 120 may control the display 110 to further display a guide UI that guides a movable range of the UI displayed on the side region.

However, the present disclosure is not limited thereto, and the processor 120 may control the display 110 to further display a guide UI that guides a movable range of the sub UI displayed on the side region described above.

Specifically, the processor 120 may be input with a user command, and may control the display 110 to move the UI or the sub UI displayed on the side region described above in a direction corresponding to the user command and to display the UI or the sub UI.

According to exemplary embodiments, if the processor 120 receives a user drag command, the processor 120 may control the display 110 to move the UI or the sub UI displayed on the side region in an upper direction or a lower direction corresponding to the input drag command and to display the UI or the sub UI.

In this case, if the guide UI is displayed, the processor 120 may control the display 110 to move the UI or the sub UI displayed on the side region in the direction corresponding to the user command up to a point at which the guide UI is displayed and to display the UI or the sub UI.

Meanwhile, in a case in which the view inside application is executed as described above, the processor 120 may control the display 110 to display the image obtained by photographing the inside of the food storage apparatus 100 in which the food is stored.

Therefore, the display 110 may display the image obtained by photographing the inside of the food storage apparatus 100 in which the food is stored.

Meanwhile, if one of a plurality of objects included in the photographed image is selected, the processor 120 controls the display 110 to display an input UI for inputting information related to the selected object.

Accordingly, the display 110 may display the input UI including a plurality of icons around the selected object.

Therefore, the processor 120 performs various operations according to a selection command of the user for the icons included in the displayed input UI.

According to exemplary embodiments, when a user command for a first icon of the plurality of icons included in the displayed input UI is received, the processor 120 controls the display 110 to display a memo UI for inputting information related to a pre-selected object.

Thereafter, when a user command is received through the displayed memo UI, the processor 120 generates a tag UI including a memo corresponding to the input user command. Thereafter, the processor 120 controls the display 110 to overlap the image obtained by photographing the inside of the food storage apparatus 100 in which the food is stored with the tag UI and to display it.

Accordingly, the display 110 may overlap the image obtained by photographing the inside of the food storage apparatus 100 in which the food is stored with the tag UI and display it.

Meanwhile, when a selection command is received in a state in which the tag UI is displayed, the processor 120 may control the display 110 to again display the memo UI for inputting information related to an object corresponding to the selected tag UI.

Meanwhile, when a selection command for a second icon of the plurality of icons included in the input UI is received, the processor 120 executes a food list application for providing food information for each of foods stored in the food storage apparatus 10. Accordingly, the display 110 displays an execution screen of the food list application.

As such, when food information related to the pre-selected object is received in a state in which the execution screen of the food application is displayed, the processor 120 registers pre-received food information with the food list stored in the executed food list application.

Meanwhile, when a selection command for a third icon of the plurality of icons included in the input UI is received, the processor 120 executes a shopping list application for purchasing the food. Accordingly, the display 110 displays an execution screen of the shopping list application.

As such, when food information related to the pre-selected object is received in a state in which the execution screen of the shopping list application is displayed, the processor 120 registers pre-received food information with the shopping list stored in the executed shopping list application.

According to a further aspect of the present disclosure, when a voice command for purchasing the food is received, the processor 120 may execute the shopping list application. Thereafter, the processor 120 may register food information related to the pre-received voice command with the shopping list stored in the executed shopping list application.

However, the present disclosure is not limited thereto, and when the voice command for the food stored in the food storage apparatus 100 is received, the processor 120 may execute a food list application, and may register food information related to the pre-received voice command with the food list stored in the executed food list application.

According to a further aspect of the present disclosure, the processor 120 may execute a recipe application for guiding a food cooking for each cooking according to the user command. Thereafter, when a user command for a specific cooking is received, the processor 120 controls the display 110 to display ingredient information on the corresponding cooking.

Accordingly, the display 110 may display the ingredient information on the cooking requested by the user.

Meanwhile, the processor 120 may control the display 110 to display ingredients related to the foods which are in the food storage apparatus 100 among the ingredients displayed on the screen and the remaining ingredient to be different from each other based on the food list stored in the food list application providing the food information on the foods stored in the food storage apparatus 100.

Accordingly, the display 110 may display ingredient information in which the ingredients stored in the food storage apparatus 100 among the ingredients for the cooking requested by the user and the remaining ingredient are displayed to be different from each other.

However, the present disclosure is not limited thereto, and the processor 120 may control the display 110 to display information on the remaining ingredient except for the foods stored in the food storage apparatus 100 among the ingredients of the cooking requested by the user based on the food list stored in the food list application providing the food information on the foods stored in the food storage apparatus 100.

Accordingly, the display 110 may display ingredient information on the remaining ingredient except for the ingredients stored in the food storage apparatus 100 among the ingredients for the cooking requested by the user.

Figure 3:
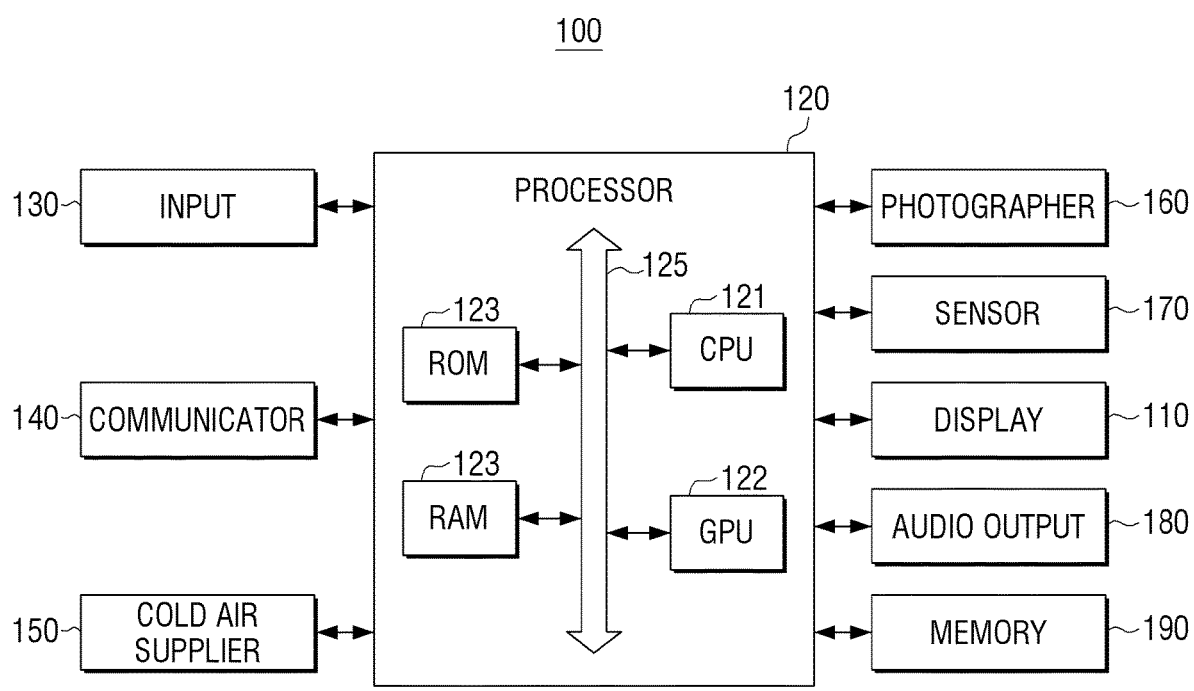
FIG. 3 is a detailed block diagram of the food storage apparatus according to an exemplary embodiment of the present disclosure.

FIG. 3 is a detailed block diagram of the food storage apparatus according to an exemplary embodiment of the present disclosure.

As illustrated in FIG. 3, the food storage apparatus 100 may further include an input 130, a communicator 140, a cool air supplier 150, a photographer 160, a sensor 170, an audio output 180, and a memory 190, in addition to the configurations of the display 110 and the processor 120 described above.

The input 130 receives various user commands. Such an input 130 may include at least one of an operator, a touch input, a user input, and a microphone.

The operator may be implemented in a key pad including a variety of function keys, numeric keys, special keys, letter keys, and the like, and the touch input may be implemented in a touch pad forming an interlayer structure with the display 110 when the display 110 described above is implemented in a form of touch screen. In this case, the touch input may receive a touch command for icons included in various UIs displayed through the display 110 described above.

The user input receives an IR signal or an RF signal from a remote controller (not shown) controlling the food storage apparatus 100, and the microphone receives the voice command of the user.

The communicator 140 performs data communication with a web server (not shown) providing contents, a user terminal (not shown) such as a pre-registered smartphone, and a server (not shown) of a store selling various products.

Such a communicator 140 may include a connector including at least one of wireless communication modules such as a local area communication module, a wireless LAN module, and the like, and wired communication modules such as a high-definition multimedia interface (HDMI), a universal serial bus (USB), institute of electrical and electronics engineers (IEEE) 1394, and the like.

The local area communication module is a configuration wirelessly performing local area communication between the food storage apparatus 100 and a user terminal (not shown). Such a local area communication module may include at least one of a Bluetooth module, an infrared data association (IrDA) module, a near field communication (NFC) module, a WiFi module, and a Zigbee module.

In addition, the wireless communication module is a module connected to an external network according to a wireless communication protocol such as IEEE or the like, to perform communication. Besides, the wireless communication module may further include a mobile communication module connected to a mobile communication network according to various mobile communication standards such as 3rd generation (3G), 3rd generation partnership project (3GPP), Long Term Evolution (LTE), and the like to perform communication.

As such, the communicator 140 may be implemented by various local area communication schemes described above, and may adopt other communication technologies which are not mentioned in the present specification.

Meanwhile, the connector is a configuration providing an interface with various source devices such as USB 2.0, USB 3.0, HDMI, IEEE 1394, and the like. Such a connector may receive contents data transmitted to a web server (not shown) through a wired cable connected to the connector. Further, the connector may receive power from a power source through a wired cable which is physically connected to the connector.

The cool air supplier 150 is a configuration supplying cool air so that a predetermined temperature is maintained in the chamber in which the food is stored in the food storage apparatus 100. In particular, in a case in which different temperatures are set for each of the regions, the cool air supplier 160 may supply cool air of different strengths to each of the regions so that the temperature which is set for each of the regions may be maintained.

The photographer 160 may photograph the inside of the food storage apparatus 100, and the sensor 170 may sense whether or not the user closes to the food storage apparatus 100, or sense an inside temperature of the food storage apparatus 100. Further, the sensor 170 may measure a sensed value for determining a state for the food stored in the food storage apparatus 100.

The audio output 180 outputs audio data included in the contents displayed through the display 110 or recipe information for each cooking provided through a recipe application to be described below in a form of audible sound.

The memory 190 may store list related information stored in a variety of applications to be described below. Further, the memory 190 may further store various operating programs for controlling an operation of the food storage apparatus 100. Here, when the food storage apparatus 100 is turned on, the operating program may be a program which is read and compiled in the memory 190 to operate the respective configurations of the food storage apparatus 100.

Meanwhile, the processor 120 described above may include a central processing unit (CPU) 121, a graphic processing unit (GPU) 122, a read only memory (ROM) 123, and a random access memory (RAM) 124, and the CPU 121, the GPU 122, the ROM 123, and the RAM 124 may be connected to each other through a bus 125.

The CPU 121 accesses the memory 190 and performs a booting using an operating system (O/S) stored in the memory 190. In addition, the CPU 121 performs various operations using a variety of programs, contents, data, and the like stored in the memory 190.

The GPU 122 generates a display screen including various objects such as icons, images, texts, and the like. Specifically, the GPU 122 calculates attribute values such as coordinate values at which the respective objects are to be displayed, forms of the respective objects, sizes thereof, colors thereof, and the like according to a layout of the screen based on the received control command, and generates a display screen of various layouts including the objects based on the calculated attribute values.

The ROM 123 stores a set of instructions for booting a system, and the like. When a turn-on instruction is input to supply power to the CPU 121, the CPU 121 copies an operating system (OS) stored in the memory 140 in the RAM 124 according to the instructions stored in the ROM 123, and executes the OS to boot the system. When the booting is completed, the CPU 121 copies a variety of programs stored in the memory 190 in the RAM 124, and executes the programs copied in the RAM 124 to perform a variety of operations.

Such a processor 120 may be coupled to the respective configurations described above to be implemented in system-on-a-chip or system on chip (SoC).

Meanwhile, the operations of the processor 120 described above may be performed by the program stored in the memory 190. Here, the memory 190 may be implemented in at least one of the ROM 123, the RAM 124, a memory card (e.g., an SD card, a memory stick) which is removable/mountable from the food storage apparatus 100, a non-volatile memory, a volatile memory, a hard disk drive (HDD), or a solid state drive (SSD).

Hereinabove, the respective configurations configuring the food storage apparatus 100 according to the present disclosure have been described in detail. Hereinafter, an operation of the food storage apparatus 100 according to the present disclosure will be described in detail.

Figure 4:
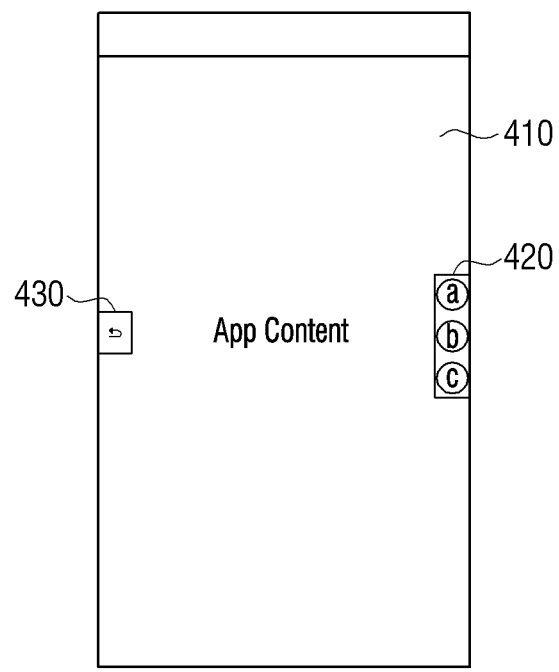
FIG. 4 is an illustrative view of a user interface (UI) displayed on the food storage apparatus according to an exemplary embodiment of the present disclosure.

FIG. 4 is an illustrative view of a user interface (UI) displayed on the food storage apparatus according to an exemplary embodiment of the present disclosure.

As illustrated in FIG. 4, the food storage apparatus 100 may display an execution screen 410 of the application requested by the user. Further, the food storage apparatus 100 may display an UI 420 for controlling the execution screen of the corresponding application on one side region on which the execution screen 410 of the application is displayed. Here, the UI 420 displayed on one side region may include one or more icons which are predetermined in relation to the application which is being executed.

For example, in a case in which the application which is being executed is the view inside application, the UI 420 displayed on one side region may include a first icon for returning to a previous execution screen in the view inside application, a second icon for editing or controlling a current execution screen of the view inside application, and a third icon for providing a sub UI for additionally editing or controlling the execution screen of the view inside application which is being executed.

Meanwhile, in a case in which the application which is being executed is the recipe application, the UI 420 displayed on one side region may include an icon for searching for the cooking.

In addition, in a case in which the application which is being executed is the food list application or the shopping list application, the UI 420 displayed on one side region may include a first icon for registering information on the food stored in the food storage apparatus 100 or registering information on the food to be purchased, and a second icon for providing a sub UI for additionally editing or controlling the execution screen of the food list or shopping list application which is being executed.

Meanwhile, the food storage apparatus 100 may further include a fixed UI 430 which is set to be always displayed on the other side region on which the execution screen 410 of the application is displayed. Here, the fixed UI 430 may be, for example, an UI for returning to a previous screen or returning to an initial screen.

As such, the UI 420 displayed on one side region and the fixed UI 430 displayed on the other side region may be displayed at predetermined positions.

As illustrated, the UI 420 displayed on one side region and the fixed UI 430 displayed on the other side region may be displayed at the center position of the respective side regions.

Meanwhile, the food storage apparatus 100 may move the UI 420 and the fixed UI 430 which are each displayed on one side region and the other side region of the screen according to the user command.

Figure 5A:
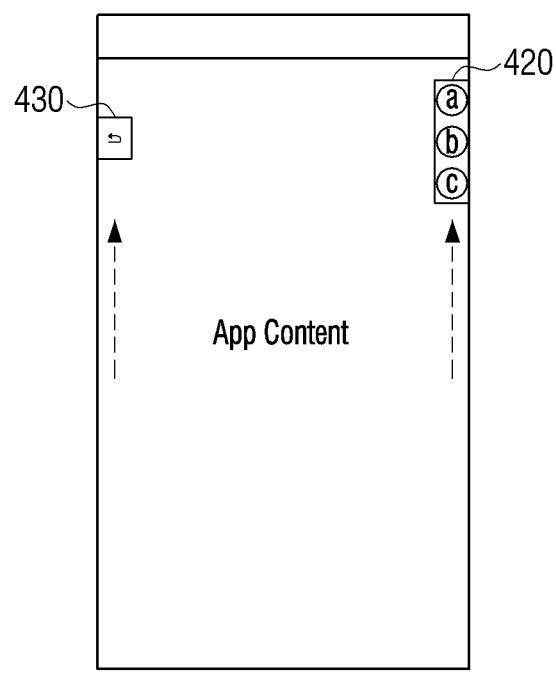
FIGS. 5A and 5B are first illustrative views illustrating cases in which the UI displayed on the food storage apparatus according to an exemplary embodiment of the present disclosure is controlled.
Figure 5B:
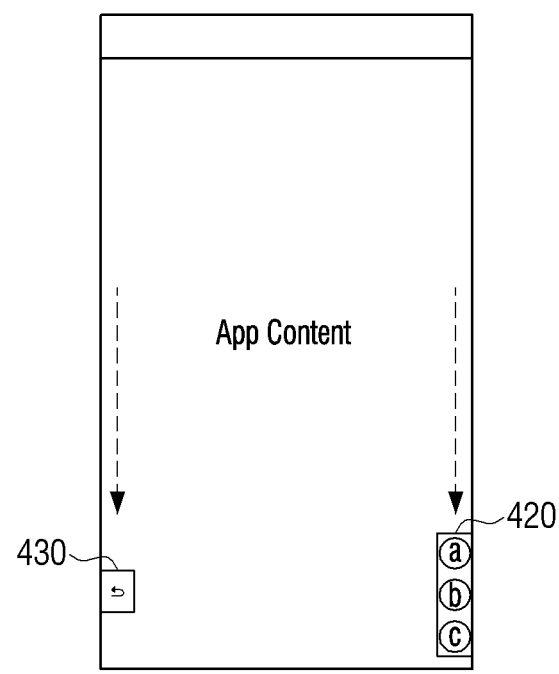
Figure 6A:
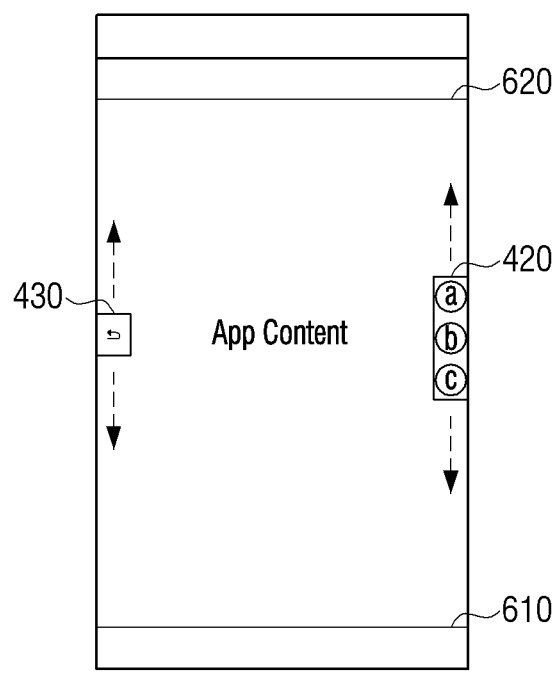
FIGS. 6A and 6B are second illustrative views illustrating cases in which the UI displayed on a food storage apparatus according to another exemplary embodiment of the present disclosure is controlled.
Figure 6B:
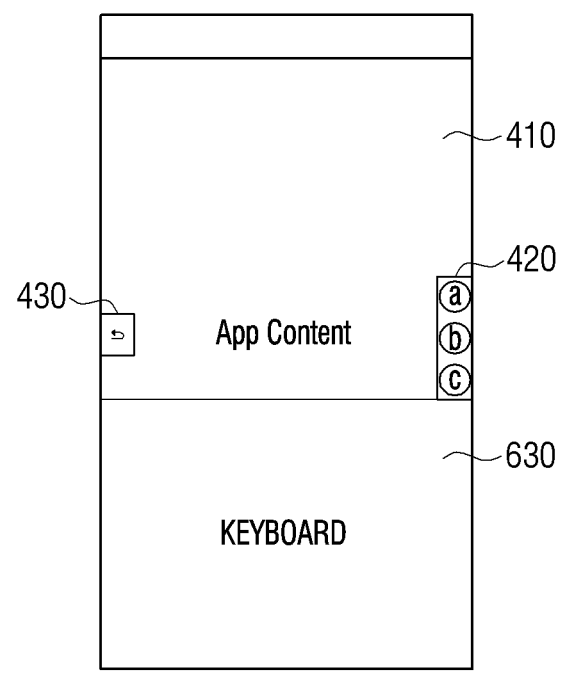

FIGS. 5A and 5B are first illustrative views illustrating cases in which the UI displayed on the food storage apparatus according to an exemplary embodiment of the present disclosure is controlled, and FIGS. 6A and 6B are second illustrative views illustrating cases in which the UI displayed on a food storage apparatus according to another exemplary embodiment of the present disclosure is controlled.

The food storage apparatus 100 may move the UI 420 displayed on one side region of the screen and the fixed UI 430 displayed on the other side region thereof in a direction corresponding to the user command.

As illustrated in FIG. 5A, the food storage apparatus 100 may move the UI 420 displayed on one side region of the screen and the fixed UI 430 displayed on the other side region thereof in an upper direction, according to the drag command of the user.

As illustrated in FIG. 5B, the food storage apparatus 100 may move the UI 420 displayed on one side region of the screen and the fixed UI 430 displayed on the other side region thereof in a lower direction, according to the drag command of the user.

However, the present disclosure is not limited thereto, and the food storage apparatus 100 may move at least one of the UI 420 displayed on one side region of the screen and the fixed UI 430 displayed on the other side region thereof in the upper or lower direction, according to the drag command of the user.

For example, when the drag command of the user is received in a state in which the UI 420 displayed on one side region of the screen is touched, the food storage apparatus 100 may move the UI 420 displayed on one side region of the screen in the upper or lower direction.

Meanwhile, when the drag command of the user is received in a state in which the fixed UI 430 displayed on the other side region of the screen is touched, the food storage apparatus 100 may move the fixed UI 430 displayed on the other side region of the screen in the upper or lower direction.

Meanwhile, the food storage apparatus 100 may move at least one of the UI 420 displayed on one side region of the screen and the fixed UI 430 displayed on the other side region thereof in the upper or lower direction within a predetermined movable range.

According to an exemplary embodiment, the food storage apparatus 100 may display first and second guide UIs 610 and 620 on upper and lower regions, respectively, as illustrated in FIG. 6A. Therefore, when the drag command of the user is received, the food storage apparatus 100 may move the UI 420 and the fixed UI 430 displayed on the side regions in a direction corresponding to the drag command within a movement range in which the first and second guide UIs 610 and 620 are displayed.

According to another exemplary embodiment, the food storage apparatus 100 may display the execution screen 410 of the application which is being displayed on the full screen on a first region according to the user command, and may display an input UI 630 for receiving the user command for the application which is being executed on the remaining second region, as illustrated in FIG. 6B. In addition, the food storage apparatus 100 may display the guide UI 610 at a boundary point between a first region on which the execution screen 410 of the application is displayed and a second region on which the input UI 630 is displayed. Therefore, when the drag command of the user is received, the food storage apparatus 100 may move the UI 420 and the fixed UI 430 displayed on the side regions in the direction corresponding to the drag command within a movement range in which the guide UI 610 is displayed.

That is, the food storage apparatus 100 may move the UI 420 and the fixed UI 430 displayed on the side regions in the direction corresponding to the drag command within the first region in which the execution screen 410 of the application is displayed.

Meanwhile, the present disclosure is not limited thereto, and the food storage apparatus 100 may display the first guide UI 610 at the boundary point between the first region on which the execution screen 410 of the application is displayed and the second region on which the input UI 630 is displayed, and may display the second guide UIs 610 and 620 on an upper region of the first region.

In this case, when the drag command of the user is received, the food storage apparatus 100 may move the UI 420 and the fixed UI 430 displayed on the side regions in the direction corresponding to the drag command within a movement range in which the first and second guide UIs 610 and 620 are displayed.

Hereinafter, when the icon included in the UI 420 displayed on the side region in the food storage apparatus 100 is selected, an operation of displaying an execution screen corresponding to the selected icon will be described in detail.

Figures 7A, 7B:
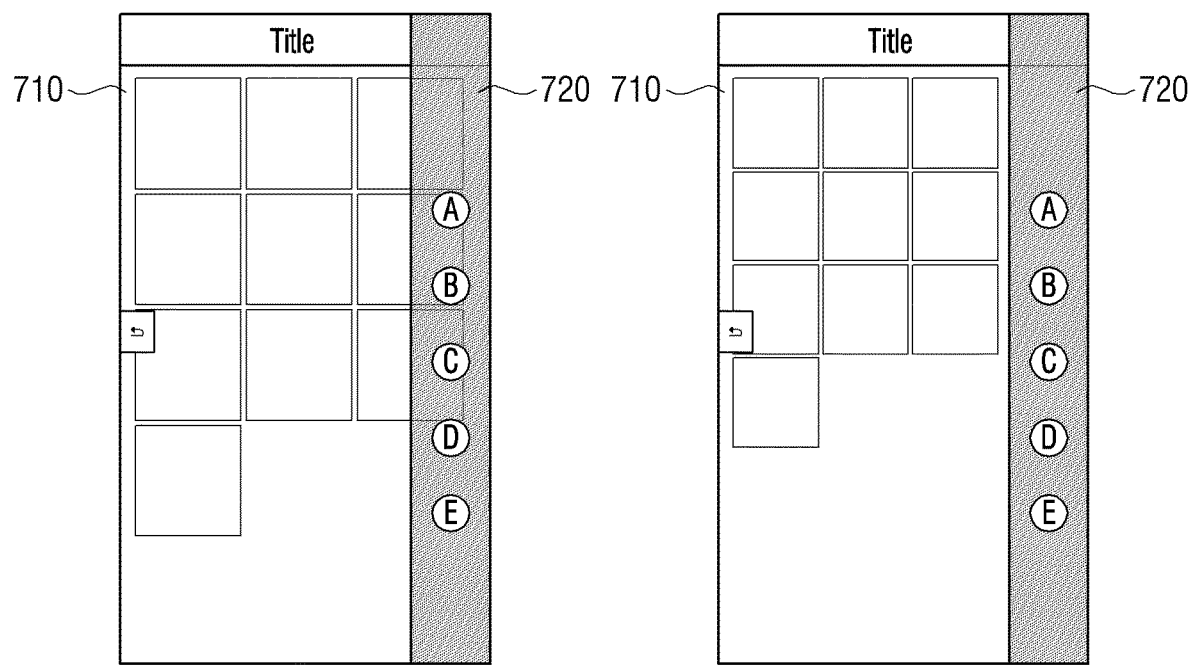
FIGS. 7A and 7B are illustrative views illustrating cases in which an execution screen is displayed according to an icon selection of the UI displayed on a side region in the food storage apparatus according to an exemplary embodiment of the present disclosure.

FIGS. 7A and 7B are illustrative views illustrating cases in which an execution screen is displayed according to an icon selection of the UI displayed on a side region in the food storage apparatus according to an exemplary embodiment of the present disclosure.

As described above, the food storage apparatus 100 may display the execution screen 410 of the application requested by the user. Further, the food storage apparatus 100 may display an UI 420 for controlling the execution screen of the corresponding application on one side region on which the execution screen 410 of the application is displayed. Here, the UI 420 displayed on one side region may include one or more icons which are predetermined in relation to the application which is being executed.

As such, in a state in which the UI 420 for controlling the execution screen of the application is displayed on one side region on which the execution screen 410 of the application is displayed, the food storage apparatus 100 may receive a selection command for one of one or more icons included in the UI 420 displayed on one side region.

When one of one or more icons included in the UI 420 displayed on one side region is selected, the food storage apparatus 100 may display the execution screen corresponding to the selected icon, and may display a sub UI 710 including an icon for controlling the displayed execution screen.

Specifically, as illustrated in FIG. 7A, when one of one or more icons included in the UI 420 displayed on one side region is selected, the food storage apparatus 100 displays the execution screen 710 corresponding to the selected icon. Further, the food storage apparatus 100 displays the sub UI 720 including one or more icons on some regions of the displayed execution screen 710.

That is, the food storage apparatus 100 may display the execution screen 710 corresponding to the selected icon, and may overlap the sub UI 720 including one or more icons for controlling the corresponding execution screen 710 with some regions of the displayed execution screen to display the overlapped sub UI.

Further, as illustrated in FIG. 7B, when one of one or more icons included in the UI 420 displayed on one side region is selected, the food storage apparatus 100 displays the execution screen 710 corresponding to the selected icon on a first region. In addition, the food storage apparatus 100 may display the sub UI 720 including one or more icons for controlling the execution screen 710 displayed on the first region on a second region.

Hereinafter, an operation of differently providing the input UI 630 for receiving the user command according to a type of application which is being executed in the food storage apparatus 100 will be described in detail.

Figure 8A:
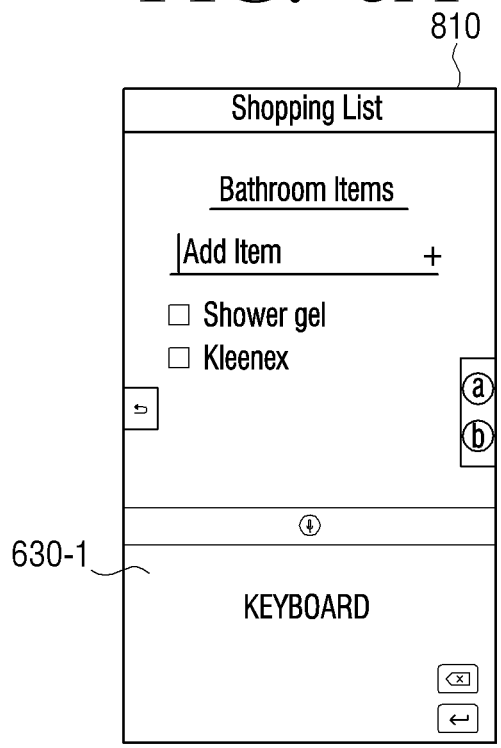
FIGS. 8A to 8C are illustrative views illustrating cases in which an input UI is provided according to a type of application which is being executed in the food storage apparatus according to an exemplary embodiment of the present disclosure.
Figure 8B:
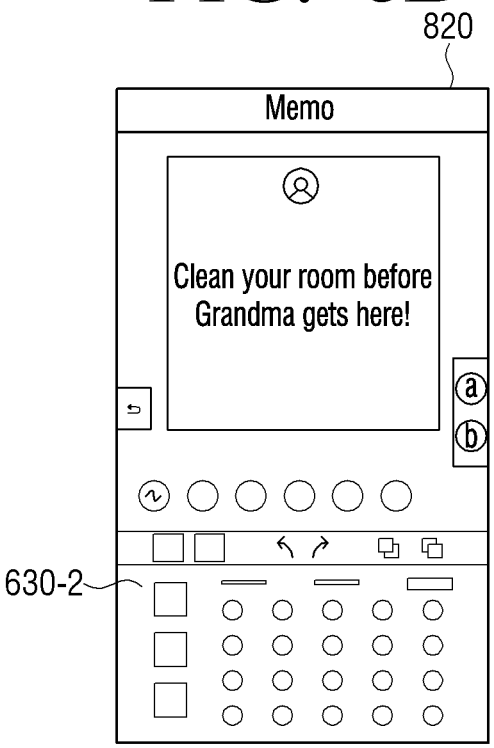
Figure 8C:
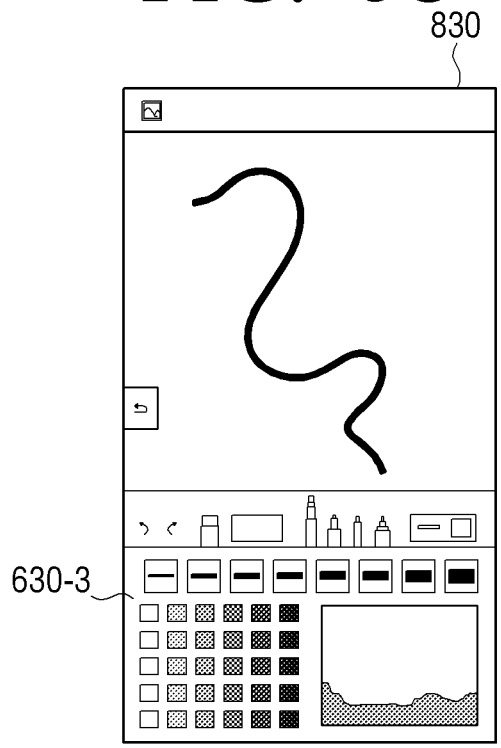

FIGS. 8A to 8C are illustrative views illustrating cases in which an input UI is provided according to a type of application which is being executed on the food storage apparatus according to an exemplary embodiment of the present disclosure.

The food storage apparatus 100 may differently provide the input UI 630 for receiving the user command, according to the type of application which is being executed.

Specifically, as illustrated in FIG. 8A, the food storage apparatus 100 may display an execution screen 810 of the shopping list application. In this case, when a user command for edition is received, the food storage apparatus 100 may display the execution screen 810 of the shopping list application which is being executed on the first region, and may display a keyboard related input UI 630-1 for receiving the user command on the second region.

Therefore, when the user command is received through the keyboard related input UI 630-1 displayed on the second region, the food storage apparatus 100 may display text information corresponding to the received user command on the execution screen 810 of the shopping list application displayed on the first region.

Meanwhile, as illustrated in FIG. 8B, the food storage apparatus 100 may display an execution screen 820 of the memo application. In this case, when a user command for edition is received, the food storage apparatus 100 may display the execution screen 820 of the memo application which is being executed on the first region, and may display an emoticon related input UI 630-2 for receiving the user command on the second region.

Therefore, when the user command is received through the emoticon related input UI 630-2 displayed on the second region, the food storage apparatus 100 may display an emoticon corresponding to the input user command on the execution screen 820 of the memo application displayed on the first region.

Meanwhile, as illustrated in FIG. 8C, the food storage apparatus 100 may display an execution screen 830 of a whiteboard application. In this case, when a user command for edition is received, the food storage apparatus 100 may display the execution screen 830 of the whiteboard application which is being executed on the first region, and may display a drawing work related input UI 630-3 for receiving the user command on the second region.

Therefore, when the user command is received through the drawing work related input UI 630-3 displayed on the second region, the food storage apparatus 100 may display a work tool image corresponding to the input user command on the execution screen 830 of the whiteboard application displayed on the first region.

Hereinafter, an operation of editing the application which is being executed in the food storage apparatus 100 will be described in detail.

FIGS. 9A to 9D are first illustrative views illustrating cases in which the application which is being executed in the food storage apparatus according to an exemplary embodiment of the present disclosure is edited.

The food storage apparatus 100 executes the shopping list application according to the user command.

Figure 9A:
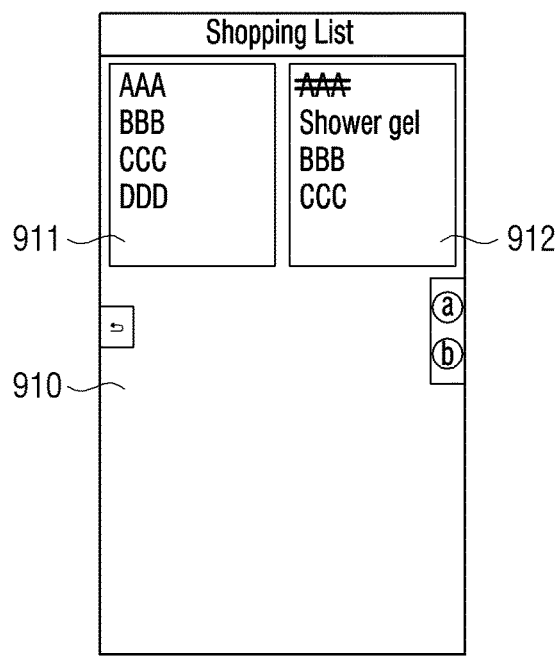
FIGS. 9A to 9D are first illustrative views illustrating cases in which the application which is being executed in the food storage apparatus according to an exemplary embodiment of the present disclosure is edited.

Accordingly, as illustrated in FIG. 9A, the food storage apparatus 100 may display an execution screen 910 of a shopping list application including a plurality of shopping lists (hereinafter, referred to as first and second shopping lists) 911 and 912.

Figure 9B:
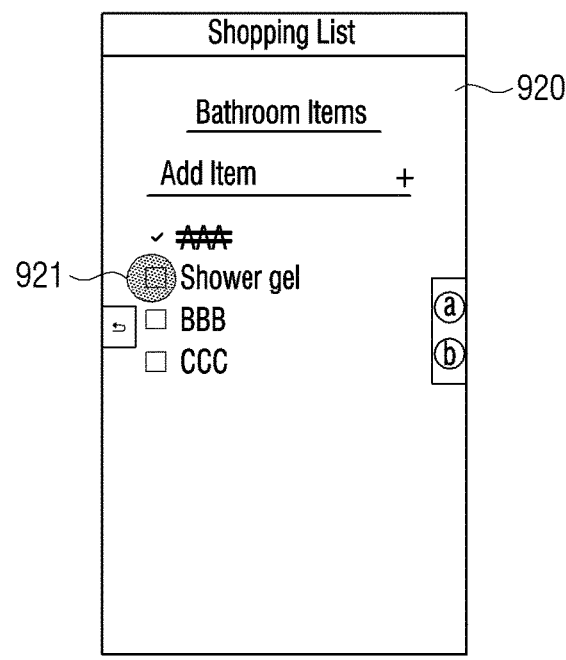

Thereafter, when a selection command for the second shopping list 912 of the displayed first and second shopping lists 911 and 912 is received, the food storage apparatus 100 displays the execution screen 920 of the second shopping list 912 as illustrated in FIG. 9B. Here, the execution screen 920 of the second shopping list 912 may include objects corresponding to each of products registered with the second shopping list 912.

Thereafter, when a selection command for an object 921 corresponding to a product of 'Shower gel' of a plurality of objects included in the execution screen 920 of the second shopping list 912 is received, the food storage apparatus 100 performs an edition operation of deleting the selected object 921 from the execution screen 920 of the second shopping list 912.

Figure 9C:
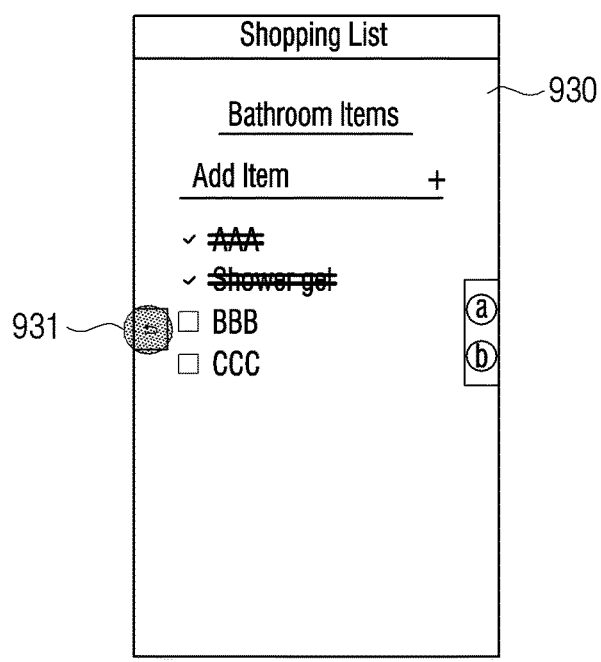

Therefore, as illustrated in FIG. 9C, the food storage apparatus 100 may display an execution screen 930 of the second shopping list 912 from which the object 921 corresponding the product of 'Shower gel' is deleted.

Figure 9D:
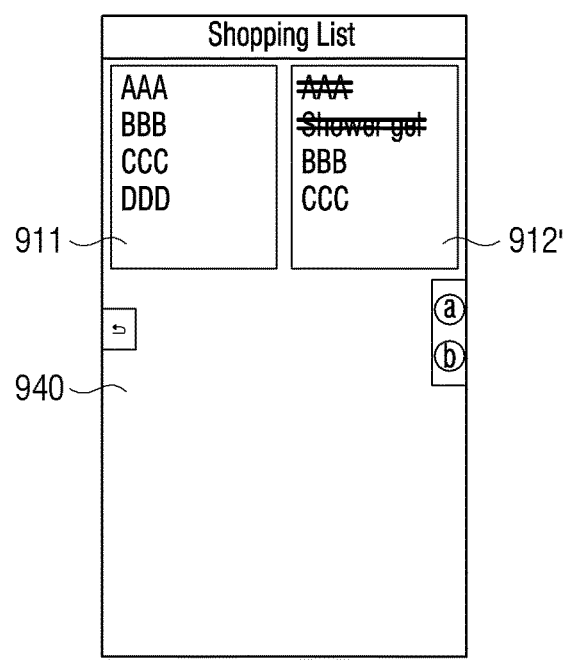

Thereafter, when a selection command for a fixed UI 931 displayed on a left side region is received, the food storage apparatus 100 may display an execution screen 940 of a shopping list application including a second shopping list 912' edited together with the first shopping list 911, as illustrated in FIG. 9D.

FIGS. 10A to 10D are second illustrative views illustrating cases in which an application which is being executed in a food storage apparatus according to another exemplary embodiment of the present disclosure is edited.

Figure 10A:
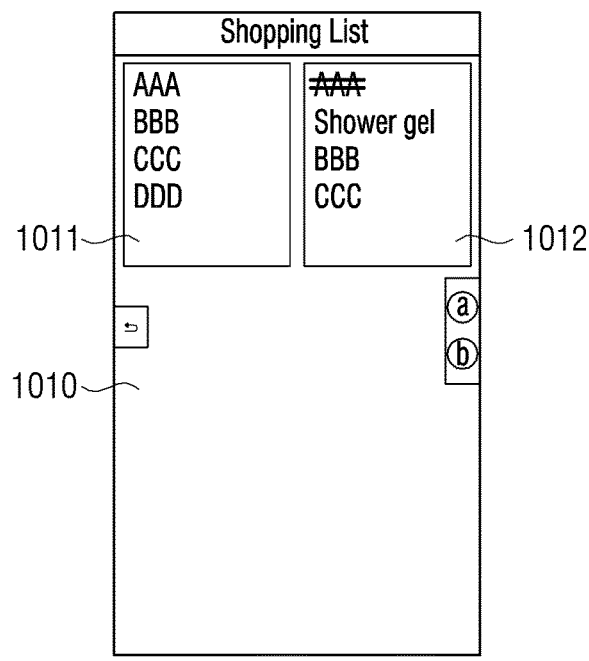
FIGS. 10A to 10D are second illustrative views illustrating cases in which an application which is being executed in a food storage apparatus according to another exemplary embodiment of the present disclosure is edited.

As described above, the food storage apparatus 100 may display an execution screen 1010 of a shopping list application including first and second shopping lists 1011 and 1012, as illustrated in FIG. 10A.

Figure 10B:
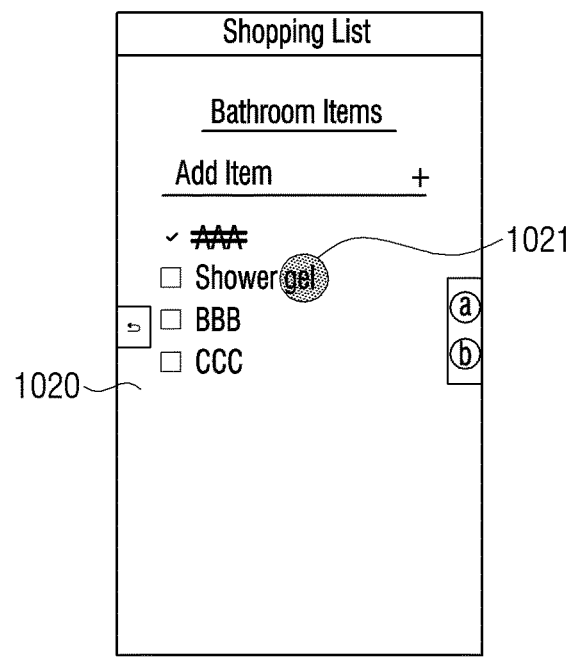

Thereafter, when a selection command for the second shopping list 1012 of the displayed first and second shopping lists 1011 and 1012 is received, the food storage apparatus 100 displays the execution screen 1020 of the second shopping list 1012 as illustrated in FIG. 10B. Here, the execution screen 1020 of the second shopping list 1012 may include objects corresponding to each of products registered with the second shopping list 1012.

Figure 10C:
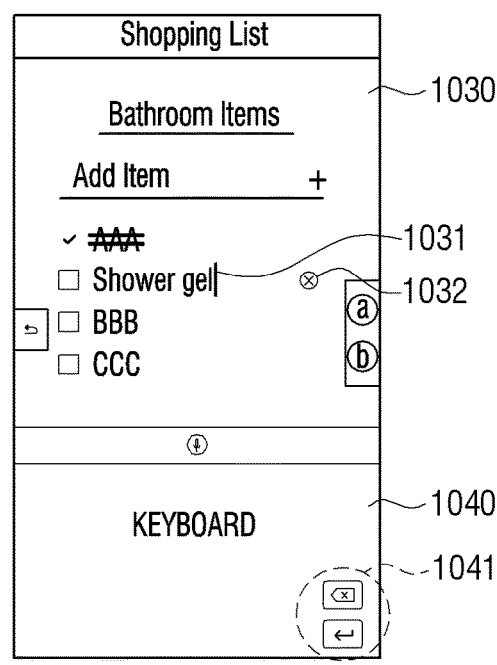

Thereafter, when a selection command for an object 1021 corresponding to a product of 'Shower gel' of a plurality of objects included in the execution screen 1020 of the second shopping list 1012 is received, the food storage apparatus 100 displays an execution screen 1030 of the second shopping list 1012 on the first region and displays a keyboard related input UI 1040 for receiving the user command on the second region, as illustrated in FIG. 10C.

Further, the food storage apparatus 100 may display a cursor 1031 at a point at which the selection command for the object 1021 is received, and a first deletion icon 1032 on one side on which the corresponding object 1021 is displayed.

Thereafter, when the selection command for the first deletion icon 1032 positioned on one side on which the object 1021 is displayed is received, the food storage apparatus 100 performs an edition operation of deleting the corresponding object 1021 from the execution screen 1020 of the second shopping list 1012.

Figure 10D:
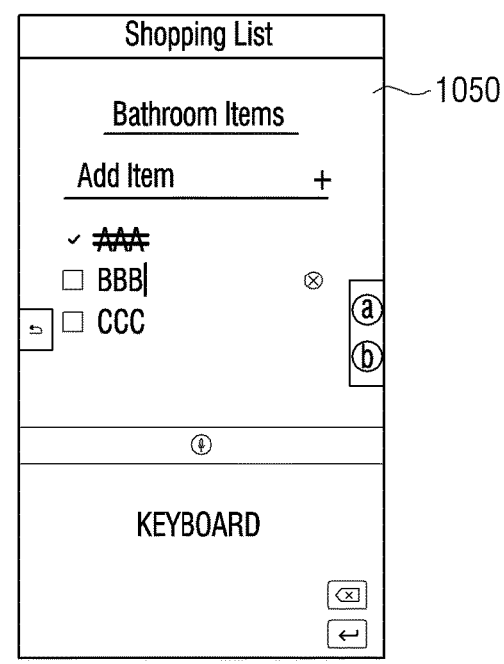

Thereafter, as illustrated in FIG. 10D, the food storage apparatus 100 may display an execution screen 1050 of the second shopping list 1012 from which the object 1021 corresponding the product of 'Shower gel' is deleted.

Meanwhile, the food storage apparatus 100 may edit the objects included in the execution screen 1030 of the second shopping list 1012 through a second deletion icon 1041 displayed on the keyboard related input UI 1040 displayed on the second region.

Specifically, when the selection command for the second deletion icon 1041 displayed on the input UI 1040 is received in a state in which the cursor 1031 is displayed on the object 1021 corresponding to the produce of 'Shower gel', the food storage apparatus 100 performs an edition operation of deleting the object 1021 according to the input selection command.

Further, when a selection command for the second deletion icon 1041 and a character icon (not shown) included in the input UI 1040 is received in a state in which the cursor 1031 is displayed on the object 1021 corresponding to the produce of 'Shower gel', the food storage apparatus 100 performs an edition operation of deleting at least one character of a plurality of characters configuring the object 1021 and displaying a new character according to the input selection command.

Hereinafter, an operation of executing the view inside application in the food storage apparatus 100 according to the present disclosure will be described in detail.

FIGS. 11A to 15C are illustrative views illustrating an execution operation of a view inside application in the food storage apparatus according to an exemplary embodiment of the present disclosure.

As illustrated in FIG. 11A, the food storage apparatus 100 may execute the view inside application according to a user request to display an execution screen of the view inside application. Here, the execution screen of the view inside application may be an image 1110 obtained by photographing the inside of the food storage apparatus 100 in which the food is stored.

While such an image 1110 obtained by photographing the inside of the food storage apparatus 100 is displayed, the food storage apparatus 100 may receive a selection command for at least one object of a plurality of objects included in the photographed image 1110.

As illustrated, the food storage apparatus 100 may receive a selection command for an object 1111 corresponding to a cake.

When such a selection command for the object 1111 is received, the food storage apparatus 100 displays an input UI 1120 for receiving information related to the object 1111 on a screen on which the image 1110 obtained by photographing the inside of the food storage apparatus 100 is displayed, as illustrated in FIG. 11B.

Here, the input UI 1120 may include a captured image 1121 obtained by capturing the selected object 1111, and a plurality of icons (hereinafter, referred to as icons a, b, and c 1122 to 1124) for receiving information related to the selected object 1111.

Thereafter, the food storage apparatus 100 may perform various operations related to the selected object 1111 according to the user command received through the displayed input UI 1120.

Specifically, the food storage apparatus 100 may edit the captured image 1121 according to the user command.

Figure 12A:
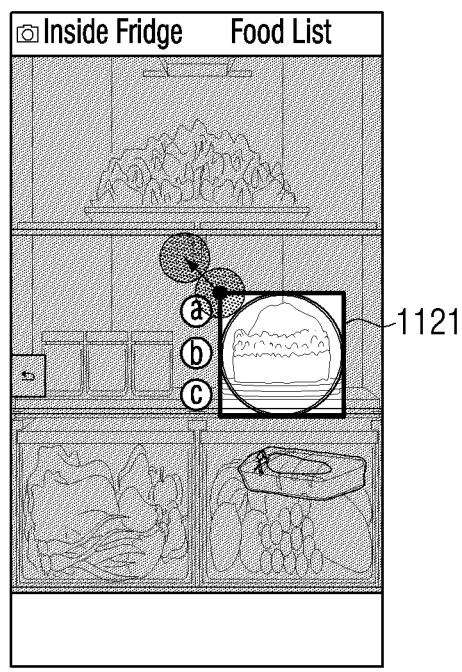

As illustrated in FIG. 12A, the food storage apparatus 100 may receive a user command moving in an outer direction in a state in which a guide line (not shown) displayed around the captured image 1121 is selected.

Figure 12B:
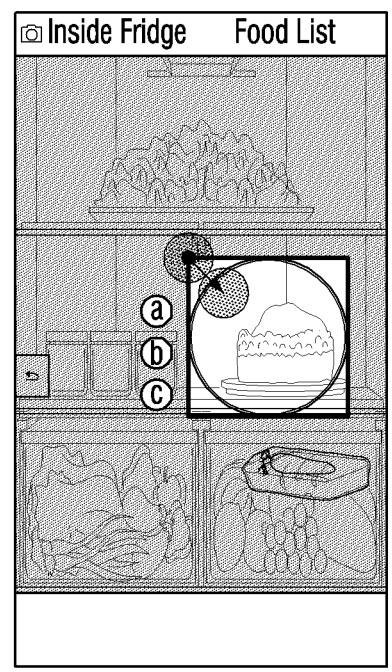

When such a user command is received, the food storage apparatus 100 enlarges the captured image 1121 in the outer direction corresponding to the received user command and displays the enlarged captured image 1121, as illustrated in FIG. 12B.

Meanwhile, when a user command moving in an inner direction is received in a state in which the captured image 1121 is enlarged in the outer direction, the food storage apparatus 100 contracts the captured image 1121 in the inner direction corresponding to the received user command and displays the contracted captured image 1121.

Figure 13A:
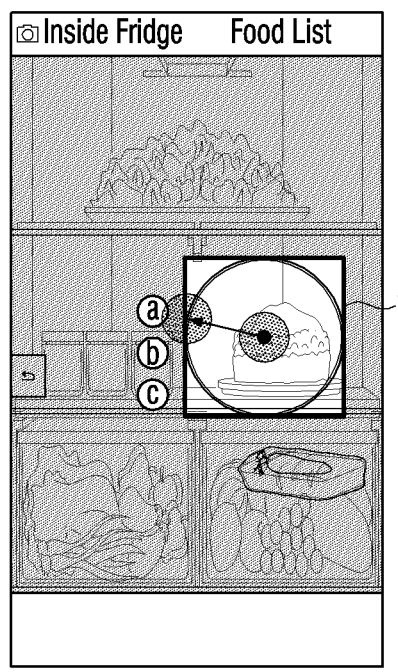

Further, as illustrated in FIG. 13A, the food storage apparatus 100 may receive a user command moving in one side direction in a state in which a region on which the captured image 1121 is displayed is selected.

Figure 13B:
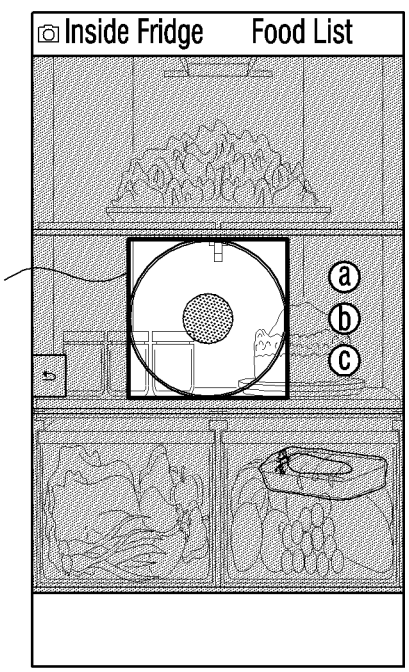

In this case, the food storage apparatus 100 may display a captured image 1121' moved in a direction corresponding to the user command on the screen, as illustrated in FIG. 13B.

Meanwhile, the food storage apparatus 100 may receive a selection command for the c icon 1124 among the icons a, b, and c 1122 to 1124 included in the input UI 1120 in FIG. 11B described above.

When such a selection command for the c icon 1124 is received, the food storage apparatus 100 displays an edition screen 1410 for generating a tag UI 1420 for the pre-selected object 1121.

Figure 14A:
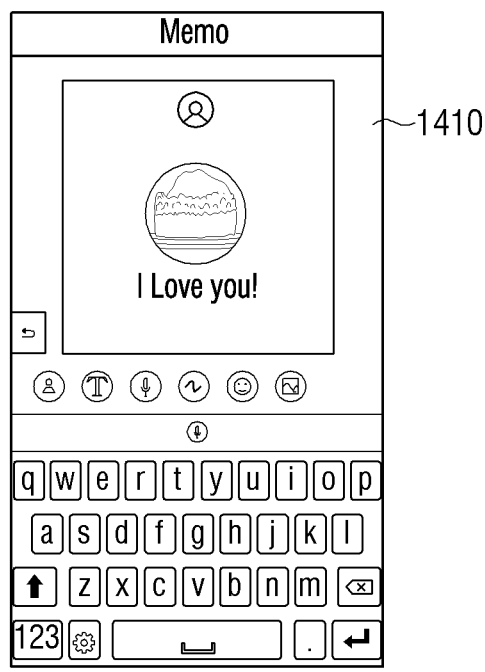
Figure 14B:
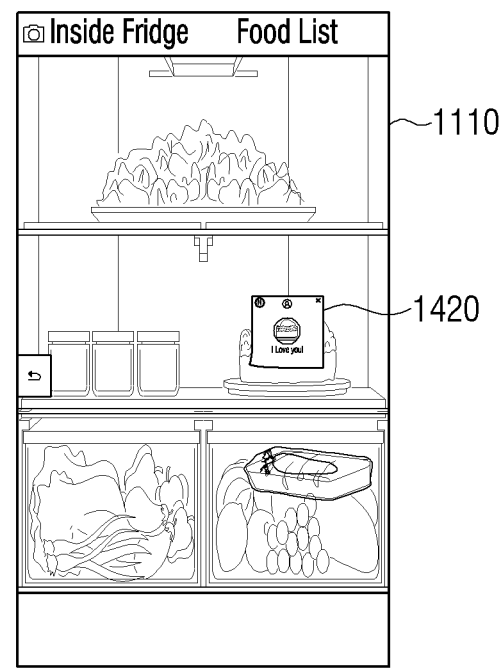

Specifically, as illustrated in FIG. 14A, the food storage apparatus 100 displays the captured image 1121 obtained by capturing the pre-selected object 1121 on the first region of the screen, and displays the keyboard related input UI on the second region.

Therefore, the food storage apparatus 100 may display an emoticon or text corresponding to the user command received through the input UI displayed on the second region on the captured image 1121 displayed on the first region.

Thereafter, the food storage apparatus 100 generates the tag UI 1420 for the pre-selected object 1121 according to the user command. Thereafter, the food storage apparatus 100 overlaps the tag UI 1420 for the pre-selected object 1121 with the image 1110 obtained by photographing the inside of the food storage apparatus 100 and displays the overlapped tag UI 1420.

In this case, the food storage apparatus 100 may overlap the tag UI 1420 with a point at which the pre-selected object 1121 is positioned according to a predetermined condition and display the overlapped tag UI 1420.

Meanwhile, the food storage apparatus 100 may move the tag UI 1420 overlapped with the image 1110 obtained by photographing the inside of the food storage apparatus 100 to be displayed and display the moved tag UI 1420 according to the user command.

Figure 15A:
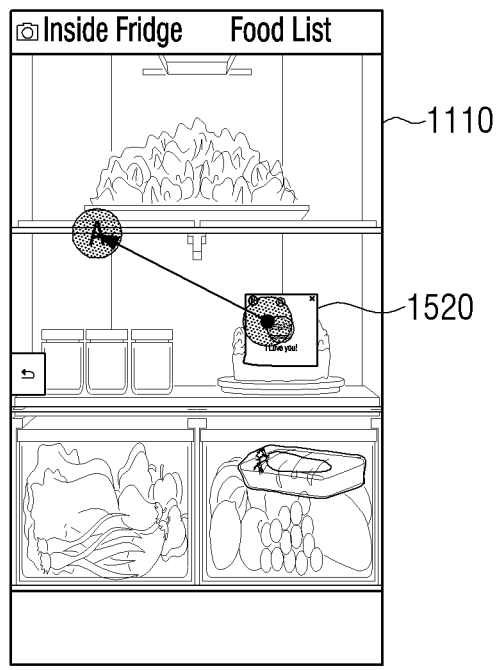
Figure 15B:
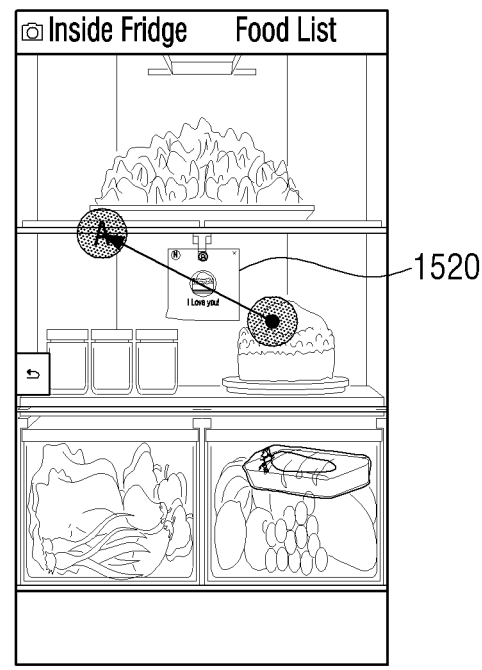

Specifically, as illustrated in FIG. 15A, the food storage apparatus 100 may receive a user command moving the tag UI 1420 for the pre-selected object 1121 to a point A.

When such a user command is received, the food storage apparatus 100 changes the tag UI 1420 into a semi-transparent state, and overlaps a tag UI 1420' of the semi-transparent state with the image 1110 obtained by photographing the inside of the food storage apparatus 100 and displays the overlapped tag UI 1420'.

Figure 15C:
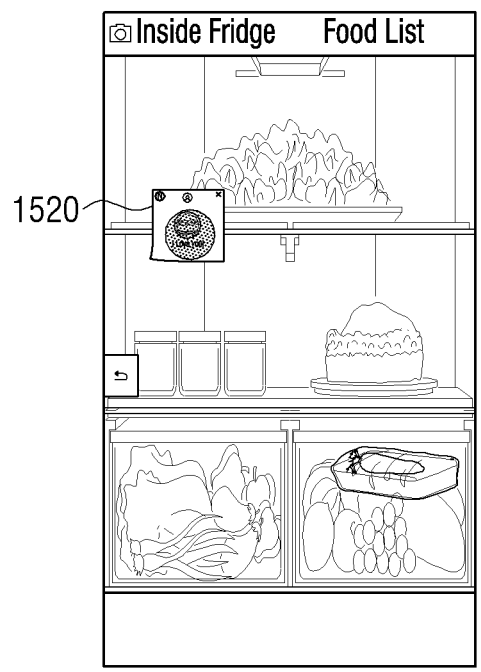

Thereafter, as illustrated in FIG. 15C, when the tag UI 1420' of the semi-transparent state is moved to the point A, the food storage apparatus 100 may change the tag UI 1420' of the semi-transparent state moved to the point A to the existing tag UI 1420 and display the changed tag UI 1420.

Hereinafter, an operation of registering food information with a shopping list in the food storage apparatus 100 will be described in detail.

Figure 16:
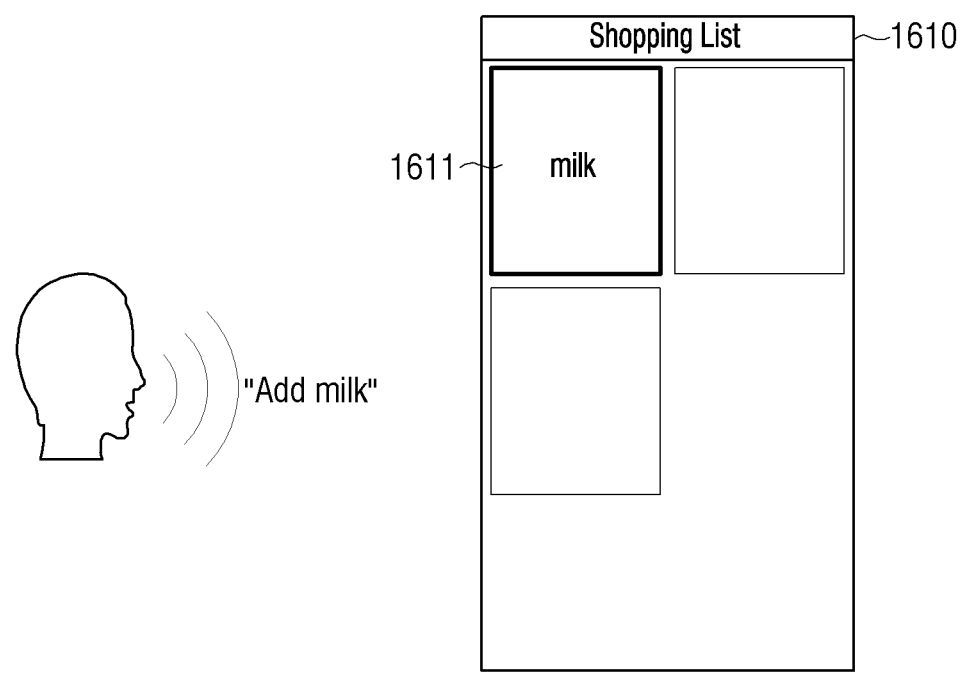
FIG. 16 is an illustrative view illustrating an execution operation of a shopping list application in the food storage apparatus according to an exemplary embodiment of the present disclosure.

FIG. 16 is an illustrative view illustrating an execution operation of a shopping list application in the food storage apparatus according to an exemplary embodiment of the present disclosure.

As illustrated in FIG. 16, the food storage apparatus 100 may display an execution screen 1610 of the shopping list application according to the user command.

According to an exemplary embodiment, when a selection command for an execution related icon of the shopping list application among icons corresponding to each of the plurality of applications is received, the food storage apparatus 100 may execute the shopping list application and display the execution screen 1610 according to the execution.

According to another exemplary embodiment, as illustrated in FIG. 11B, when a selection command for an item b 1123 of items a, b, and c 1122 to 1124 included in the input UI 1120 is received, the food storage apparatus 100 may execute the shopping list application and display the execution screen 1610 according to the execution.

When a voice command spoken from the user is received in a state in which such an execution screen 1610 of the shopping list application is displayed, the food storage apparatus 100 registers food information related to the voice command with the shopping list stored in the shopping list application.

For example, the food storage apparatus 100 may receive a voice command of "Add milk" from the user. When such a voice command is received, the food storage apparatus 100 analyzes the received voice command and extracts utterance factors referred to as "Add" and "milk". Thereafter, the food storage apparatus 100 may register food information referred to as "milk" with the shopping list based on the extracted utterance factors.

Figure 17:
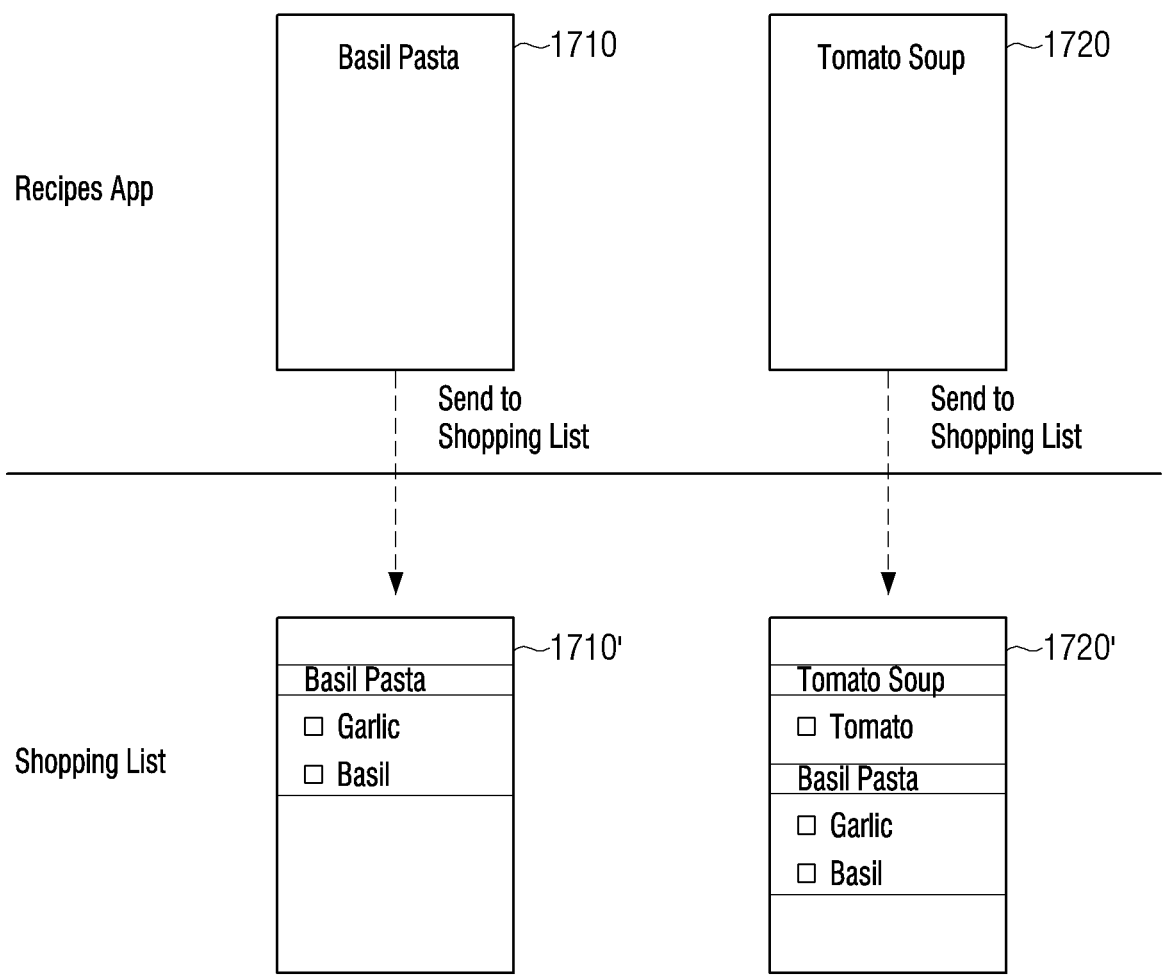
FIG. 17 is an illustrative view illustrating a case in which a plurality of applications are interworked and operated in the food storage apparatus according to an exemplary embodiment of the present disclosure.

FIG. 17 is an illustrative view illustrating a case in which a plurality of applications are interworked and operated in the food storage apparatus according to an exemplary embodiment of the present disclosure.

As illustrated in FIG. 17, the food storage apparatus 100 executes the recipe application according to the user command. Here, the recipe application may be an application providing recipes for a variety of dishes, or recommending a dish suitable for the user.

When a user command for a dish of "Basil Pasta" is received in a state in which such a recipe application is executed, the food storage apparatus 100 may provide a recipe screen 1710 guiding a recipe for cooking the dish of "Basil Pasta".

Further, when the user command for the dish of "Basil Pasta" is received, the food storage apparatus 100 may provide ingredients necessary to cook the dish of "Basil Pasta".

Further, the food storage apparatus 100 may register the ingredients necessary to cook the dish of "Basil Pasta" with the shopping list stored in the shopping list application.

Specifically, when the user command for the dish of "Basil Pasta" is received, the food storage apparatus 100 may register the necessary ingredients related to the dish of "Basil Pasta" with a shopping list 1710' stored in the shopping list application, as illustrated.

Meanwhile, when a user command for a dish of "Tomato Soup" is additionally received, the food storage apparatus 100 may provide a recipe screen 1720 guiding a recipe for cooking the dish of "Tomato Soup".

Further, the food storage apparatus 100 may provide ingredients necessary to cook the dish of "Tomato Soup" according to the user command for the dish of Tomato Soup".

Further, the food storage apparatus 100 may register the ingredients necessary to cook the dish of "Tomato Soup" with the shopping list stored in the shopping list application.

Specifically, when the user command for the dish of Tomato Soup" is received, the food storage apparatus 100 may additionally register the necessary ingredients related to the dish of "Tomato Soup" with the shopping list 1720' with which the necessary ingredients related to the food of "Basil Pasta" are registered, as illustrated.

Meanwhile, the food storage apparatus 100 may register only the remaining ingredients except for the ingredients stored in the food storage apparatus 100 among the ingredients related to the dish requested by the user with the shopping list.

Specifically, when the user command for the dish of "Basil Pasta" is received as described above, the food storage apparatus 100 determines whether or not the ingredients registered with a food list exist in the ingredients necessary to cook the dish of "Basil Pasta" with reference to the food list stored in a food list application.

Here, the food list may store food information for each of the foods stored in the food storage apparatus 100. Therefore, the food storage apparatus 100 determines whether or not the ingredients registered with the food list exist in the ingredients necessary to cook the dish of "Basil Pasta" with reference to the food information stored in the food list. Thereafter, the food storage apparatus 100 may register the remaining ingredients except for the ingredients registered with the food list among the ingredients necessary to cook the dish of "Basil Pasta" with the shopping list.

FIGS. 18A to 18D are illustrative views illustrating cases in which the foods registered with a shopping list in the food storage apparatus according to an exemplary embodiment of the present disclosure are purchased.

Figure 18A:
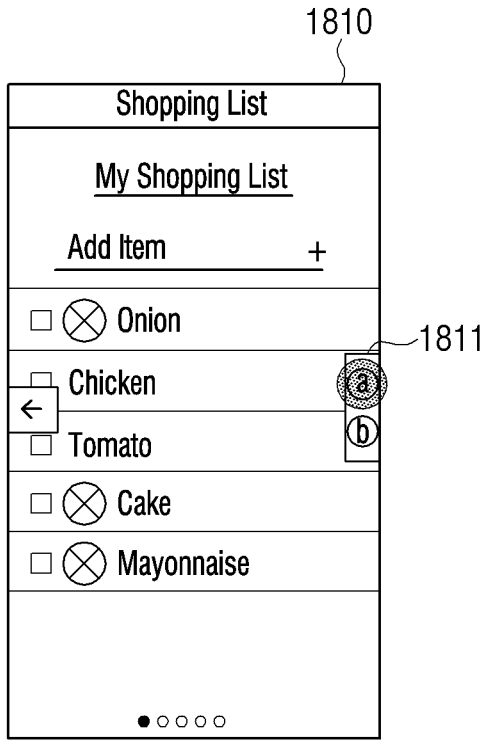
FIGS. 18A to 18D are illustrative views illustrating cases in which the foods registered with a shopping list in the food storage apparatus according to an exemplary embodiment of the present disclosure are purchased.
Figure 18B:
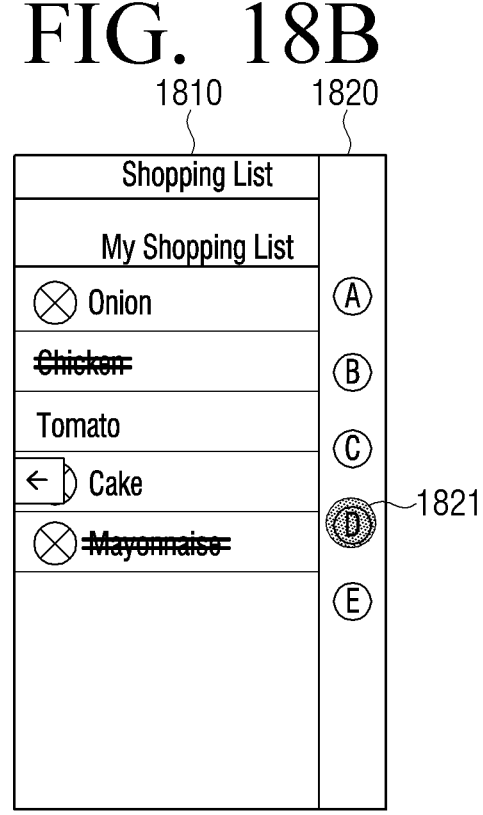

As illustrated in FIG. 18A, the food storage apparatus 100 may display an execution screen 1810 of the shopping list application according to the user command.

Here, the execution screen 1810 of the shopping list application may be a screen on which food lists registered with the shopping list are listed.

Further, the food storage apparatus 100 may display an UI 1811 including icons a and b for controlling an execution of the shopping list application on one side region of the execution screen 1810 of the shopping list application. Further, the food storage apparatus 100 may additionally display a fixed UI (not shown) for returning to a previous screen on the other side region of the execution screen 1810 of the shopping list application.

When the icon a included in the UI 1811 is selected in a state in which the execution screen 1810 of the shopping list application is displayed, the food storage apparatus 100 displays a sub UI 1820 for controlling in detail the displayed execution screen 1810 on one side region as illustrated in FIG. 18.

Figure 18C:
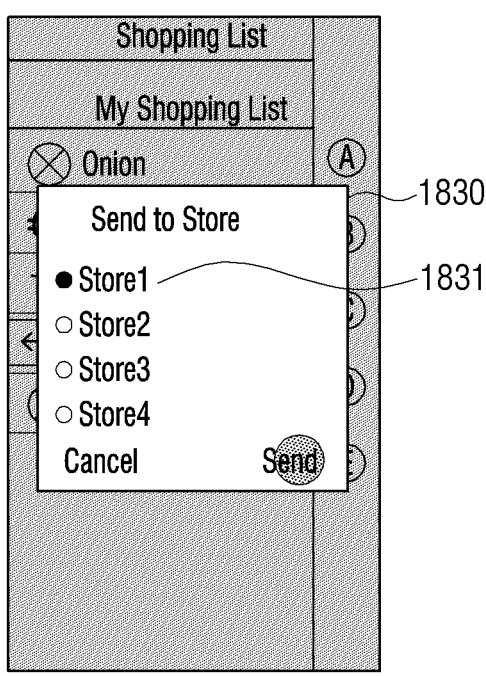

Thereafter, the food storage apparatus 100 may receive a selection command for an icon D 1821 for purchasing the food among icons A to E included in the sub UI 1820. When such a selection command for the icon D 1821 is received, the food storage apparatus 100 displays a store UI 1830 for selecting a store at which the food registered with the shopping list may be purchased, as illustrated in FIG. 18C.

Thereafter, when one (Store 1) of a plurality of stores included in the store UI 1830 is selected, the food storage apparatus 100 transmits order request information including the food information registered with the shopping list and delivery information to a server (not shown) of the selection store (Store 1). Thereafter, the food storage apparatus 100 performs payment for the food that the order is requested based on pre-registered payment information according to a payment request of the server (not shown) of the store (Store 1).

Figure 18D:
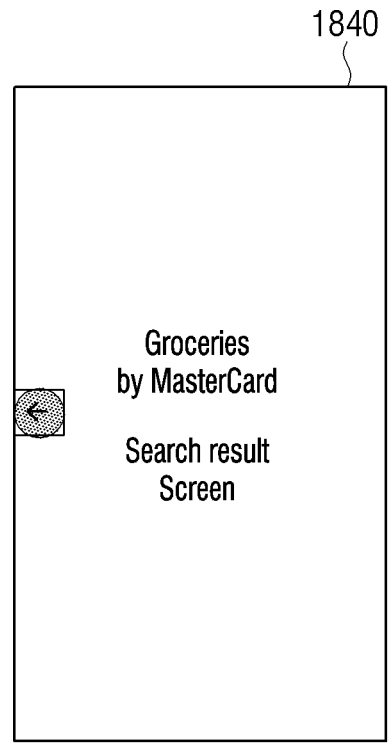

Here, since a method of performing electronic payment between the food storage apparatus 100 and the server (not shown) of the store (Store 1) is a known technology, a detailed description thereof will be omitted in the present disclosure. Thereafter, when the payment for the food that the order is requested is completed, the food storage apparatus 100 may display a payment completion screen 1840 guiding that the order is completed, as illustrated in FIG. 18D.

FIGS. 19 to 22 are illustrative views illustrating an execution operation of a recipe application in the food storage apparatus according to an exemplary embodiment of the present disclosure.

The food storage apparatus 100 may execute the recipe application according to the user command. When such a recipe application is executed, the food storage apparatus 100 may provide the following service through an execution screen of the executed recipe application.

According to an exemplary embodiment, the food storage apparatus 100 may provide a service recommending a dish suitable for the user through the execution screen of the recipe application.

According to another exemplary embodiment, the food storage apparatus 100 may provide a service guiding a recipe of the dish requested by the user through the execution screen of the recipe application.

Figure 19:
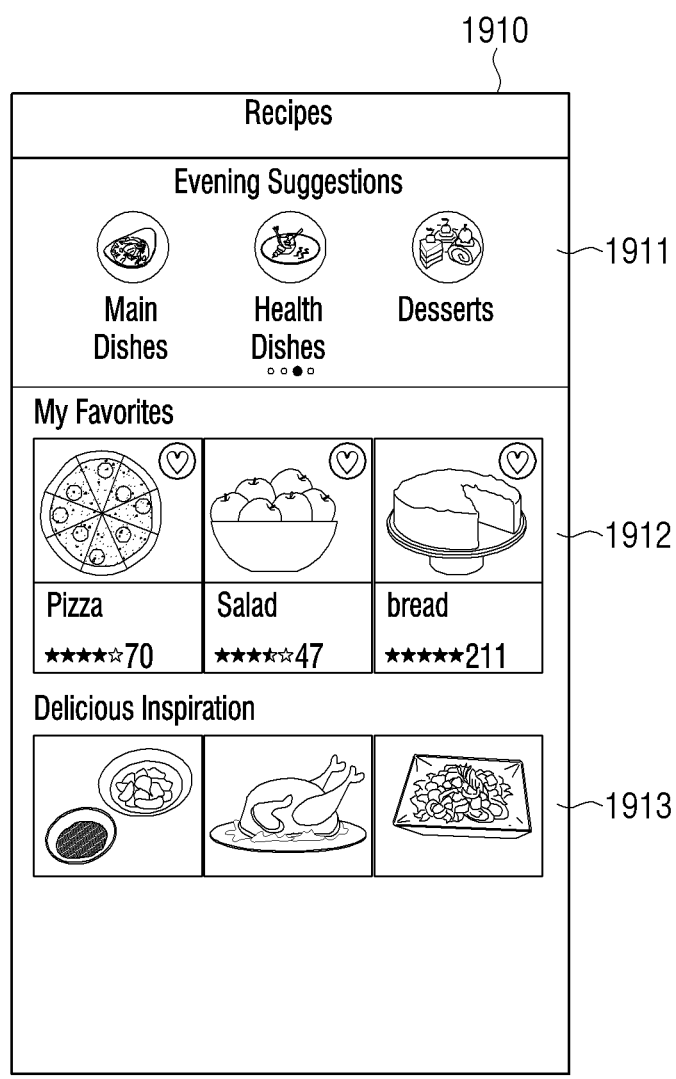
FIGS. 19 to 22 are illustrative views illustrating an execution operation of a recipe application in the food storage apparatus according to an exemplary embodiment of the present disclosure.

First, in regard to an operation of providing the service recommending the dish suitable for the user, the food storage apparatus 100 may display a recommendation service screen 1910 recommending the dish suitable for the user as illustrated in FIG. 19.

Specifically, the food storage apparatus 100 may provide a dish recommendation UI 1911 including information on the dish recommended for each time to a first region of the displayed recommendation service screen 1910, provide a favorite dish UI 1912 including information on the dish selected by the user during a predetermined period to a second region, and provide a recipe UI 1913 including recipe information on dishes recommended for the user to a third region.

Therefore, the user may receive information on the dish suitable for a current time or a specific time through the dish recommendation UI 1911 displayed on the first region of the recommendation service screen 1910.

Further, the user may confirm a kind of dish which is recently selected by the user through the favorite dish UI 1912 displayed on the second region of the recommendation service screen 1910.

Further, the user may receive a recipe for the dish that the user will cook through the recipe UI 1913 displayed on the third region of the recommendation service screen 1910.

Hereinafter, an operation of providing the recipe for the dish selected by the user will be described in detail.

As described above, the food storage apparatus 100 may receive a selection command for at least one of recipes for each of the dishes provided through the recipe UI 1913 displayed on the third region of the recommendation service screen 1910. When such a selection command is received, the food storage apparatus 100 may provide the recipe of the dish corresponding to the received selection command.

However, the present disclosure is not limited thereto, and the food storage apparatus 100 may retrieve and provide the recipe for the dish which is input from the user through an input window (not shown).

Figure 20:
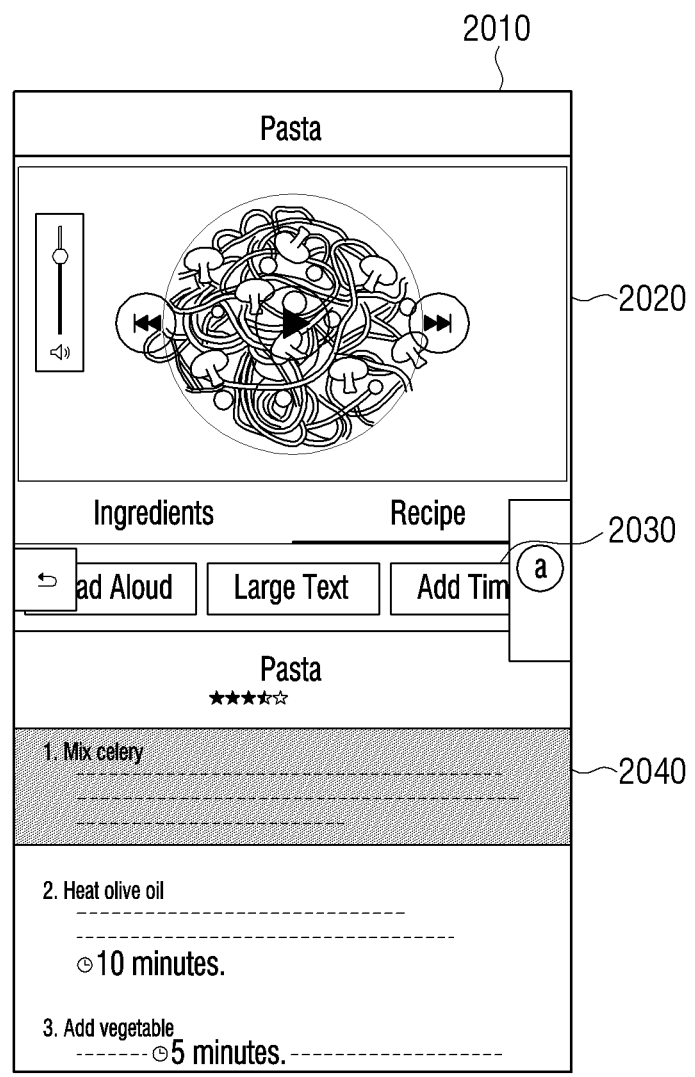

Specifically, as illustrated in FIG. 20, the food storage apparatus 100 displays a recipe screen 2010 providing the recipe for the dish requested by the user.

For example, the food storage apparatus 100 may display the recipe screen 2010 for the dish of "Pasta" according to the user command.

Specifically, the food storage apparatus 100 may display a video image guiding the recipe for the dish of "Pasta" through a first region 2020 of the displayed recipe screen 2010. In this case, the food storage apparatus 100 may display a control UI for controlling the corresponding operation on the first region 2020 on which the video image is displayed.

Further, the food storage apparatus 100 displays an UI related to providing the recipe of the dish of "Pasta" through a second region 2030 of the displayed recipe screen 2010, and displays a recipe for each of the cooking steps for cooking the dish of "Pasta" through a third region 2040 in a form of text.

Meanwhile, the UI displayed through the second region 2030 may include an icon "Read Aloud", an icon "Large Text", and an icon "Add Time".

The icon "Read Aloud" is an icon for outputting a text related to the cooking of the dish of "Pasta" displayed on the third region into audio.

In addition, the icon "Large Text" is an icon for adjusting a size of the text related to the cooking of the dish of "Pasta" displayed on the third region.

In addition, the icon "Add Time" is an icon for setting a cooking time for each of the steps for cooking the dish of "Pasta" displayed on the third region.

When a video image for cooking the dish of "Pasta" is displayed through the first region 2020, such a food storage apparatus 100 displays a recipe of a cooking step related to the video image which is currently displayed among the recipes for each of the cooking steps of the form of text displayed through the third region to be different from the recipes of the remaining cooking steps.

Accordingly, the user may easily confirm whether the video image which is being currently displayed through the first region corresponds to the recipe of which cooking step.

Meanwhile, when the icon "Read Aloud" among the icons included in the UI displayed through the second region 2030 described above is selected, the food storage apparatus 100 outputs the recipe for each of the cooking steps displayed through the third region related to the dish of "Pasta" through audio.

In this case, the food storage apparatus 100 may display the recipe of the cooking step which is output through audio among the recipes for each of the cooking steps displayed through third region to be different from the recipes of the remaining cooking steps.

Accordingly, the user may easily confirm whether the recipe which is being output through audio corresponds to which cooking step.

Meanwhile, when the icon "Add Time" among the icons included in the UI displayed through the second region 2030 described above is selected, the food storage apparatus 100 may perform the following operation.

Figure 21:
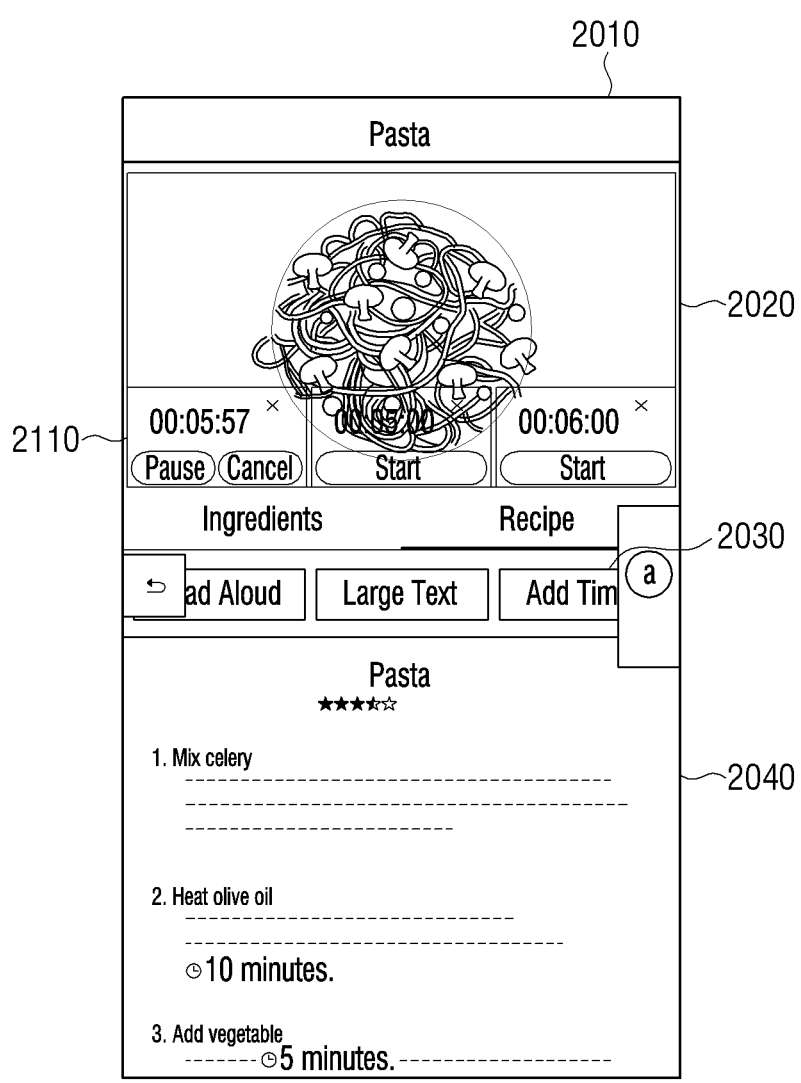

As illustrated in FIG. 21, when the icon "Add Time" among the icons included in the UI displayed through the second region 2030 described above is selected, the food storage apparatus 100 may display a timer UI 2110 for setting a time for each of the cooking steps on the first region 2020 displaying the video image for cooking the dish of "Pasta".

Therefore, the user may set and confirm the cooking time for each of the cooking steps through the timer UI 2110 displayed on the first region 2020.

Meanwhile, at least one of the recipes of each of the cooking steps displayed on the third region 2040 related to the dish of "Pasta" may include time information for each of the cooking steps.

In this case, when a selection command for the time information included in the recipe is received, the food storage apparatus 100 may display the timer UI 2110 for the time information included in the corresponding recipe on the first region 2020.

Therefore, the user may confirm the cooking time for each of the cooking steps through the timer UI 2110 displayed on the first region 2020.

Meanwhile, when the icon "Large Text" among the icons included in the UI displayed through the second region 2030 described above is selected, the food storage apparatus 100 may perform the following operation.

Figure 22:
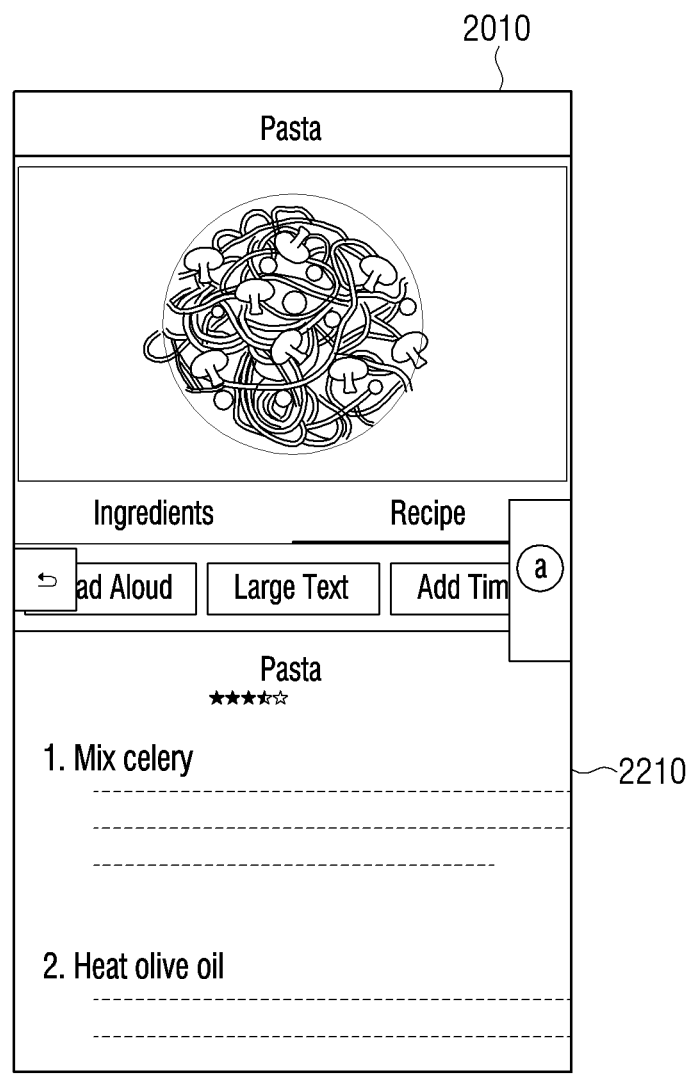

As illustrated in FIG. 22, when the icon "Large Text" among the icons included in the UI displayed through the second region 2030 is selected, the food storage apparatus 100 may enlarge a size of the text of the recipe for each of the cooking steps for the dish of "Pasta" displayed through the third region 2040 and display the enlarged text.

Accordingly, the user may easily confirm the recipe for each of the cooking steps for the dish of "Pasta" displayed through the food storage apparatus 100 even in a situation in which the user is far away from the food storage apparatus 100.

Hereinabove, various operations of the food storage apparatus 100 according to the present disclosure have been described in detail. Hereinafter, a control method of the food storage apparatus 100 according to the present disclosure will be described in detail.

Figure 23:
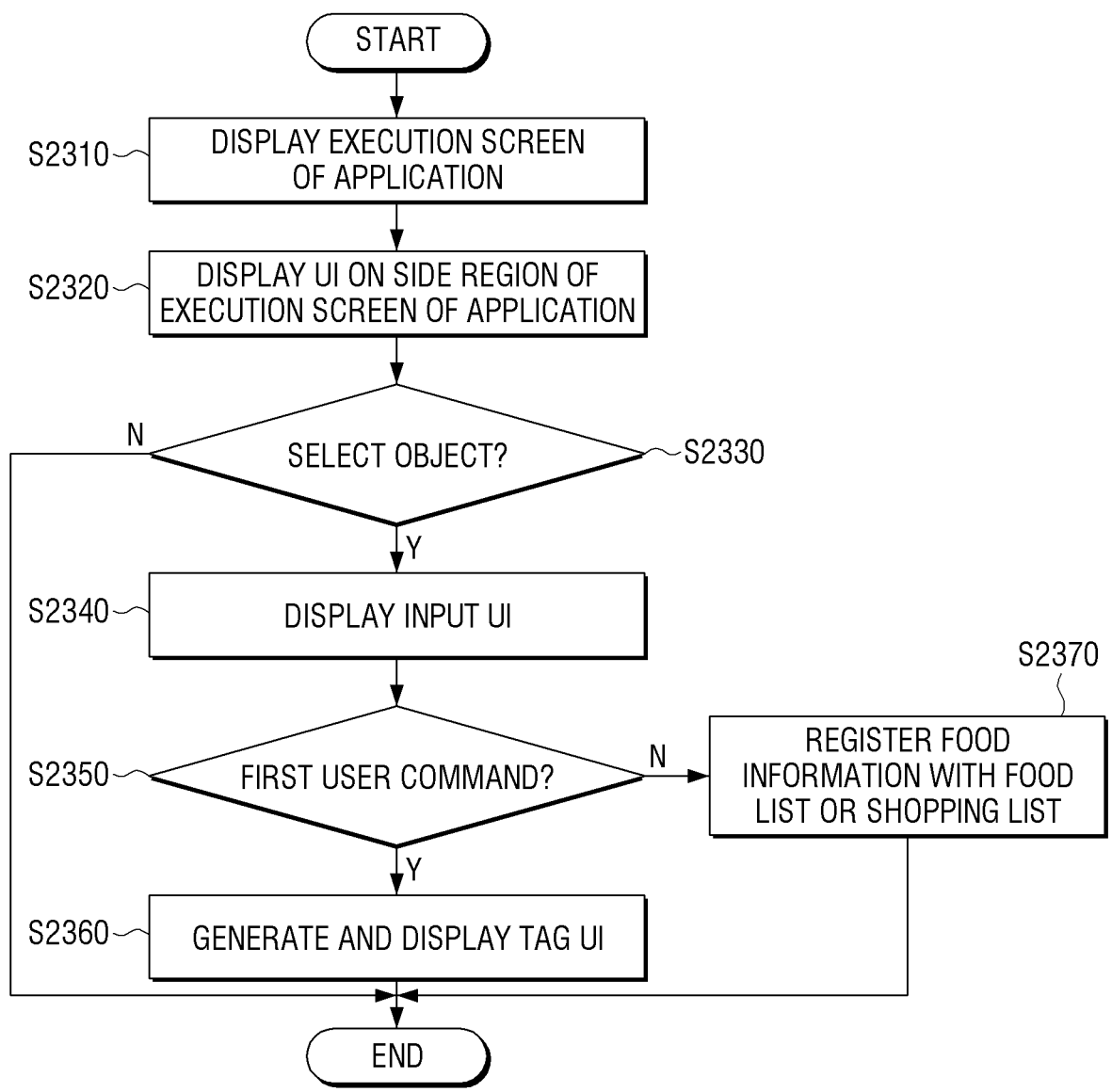
FIG. 23 is a flowchart of a control method of a food storage apparatus according to an exemplary embodiment of the present disclosure.

FIG. 23 is a flowchart of a control method of a food storage apparatus according to an exemplary embodiment of the present disclosure.

As illustrated in FIG. 23, the food storage apparatus 100 displays an execution screen of an application related to the food storage apparatus 100 (S2310).

Further, while the execution screen of the application is displayed, the food storage apparatus 100 displays an UI including one or more icons for controlling the execution screen of the corresponding application on a side region of the execution screen of the corresponding application (S2320).

Here, the application related to the food storage apparatus 100 may be a view inside application for providing an image obtained by photographing the inside of the food storage apparatus 100. Therefore, the food storage apparatus 100 may display the UI for controlling the execution screen of the corresponding image on the side region of the image obtained by photographing the inside of the food storage apparatus 100.

According to an additional aspect of the present disclosure, the food storage apparatus 100 may further display a guide UI guiding a movable range of the UI displayed on the side region of the execution screen of the application.

Meanwhile, when one of one or more icons included in the UI displayed on the side region is selected, the food storage apparatus 100 displays an execution screen corresponding to the selected icon. Further, the food storage apparatus 100 may display a sub UI including an icon for controlling the corresponding execution screen on the side region of the execution screen corresponding to the selected icon.

Meanwhile, while the image obtained by photographing the inside of the food storage apparatus 100 is displayed, the food storage apparatus 100 determines whether or not a selection command for objects included in the displayed image is received (S2330).

As a result of the determination, when it is determined that one of a plurality of objects included in the displayed image is selected, the food storage apparatus 100 displays input UI for inputting information related to the selected object (S2340).

Thereafter, the food storage apparatus 100 determines whether or not a first user command is received through the displayed input UI, and generates and displays a tag UI when it is determined that the first user command is received (S2340, S2350).

Meanwhile, when it is determined that another user command is received through the displayed input UI, the food storage apparatus 100 registers food information with a food list or a shopping list (S2360).

Specifically, when a user command selecting a first icon of a plurality of icons included in the input UI is received, the food storage apparatus 100 displays a memo UI for inputting information related to the selected object. Thereafter, when a user command is received through the displayed memo UI, the food storage apparatus 100 generates the tag UI including a memo corresponding to the received user command. Thereafter, the food storage apparatus 100 overlaps the corresponding tag UI with the image obtained by photographing the inside of the food storage apparatus 100 and displays the overlapped tag UI.

Meanwhile, when a selection command for the displayed tag UI is received, the food storage apparatus 100 may display the memo UI for inputting information related to the object corresponding to the selected tag UI.

Meanwhile, when a user command selecting a second icon of the plurality of icons included in the input UI is received, the food storage apparatus 100 executes a food list application for providing food information for each of the foods stored in the food storage apparatus 100.

Thereafter, when the food information related to the selected object is received, the food storage apparatus 100 may register the food information which is received related to the pre-selected object with the food list stored in the executed food list application. Here, the food list may be information for providing information the foods stored in the food storage apparatus 100.

Meanwhile, when a user command selecting a third icon of the plurality of icons included in the input UI is received, the food storage apparatus 100 executes the shopping list application.

Thereafter, when the food information related to the pre-selected object is received, the food storage apparatus 100 may register the corresponding food information with the shopping list stored in the executed shopping list application.

According to an additional aspect of the present disclosure, when a voice command of the user for purchasing the food is received, the food storage apparatus 100 executes the shopping list application. Thereafter, the food storage apparatus 100 may register food information related to the pre-received voice command with the shopping list stored in the executed shopping list application.

Meanwhile, the food storage apparatus 100 may execute the recipe application for guiding a recipe for each cooking according to the user command. When a user command for a specific cooking is received in a state in which such a recipe application is executed, the food storage apparatus 100 may display ingredient information for the corresponding cooking.

Here, the food storage apparatus 100 may differently display the ingredients related to the foods which are in the food storage apparatus 100 among the ingredients for the cooking requested by the user and the remaining ingredients, based on the food list stored in the food list application providing the food information on the food stored in the food storage apparatus 100.

The process executed as an exemplary embodiment of the present disclosure may be stored in a non-transitory readable medium in a form of program, and this does not mean a medium that stores data for a short period such as a register, a cache, a memory, or the like, but means a machine readable medium that semi-permanently stores the data. Specifically, various applications or programs described above may be stored and provided in the non-transitory readable medium such as a compact disc (CD), a digital versatile disk (DVD), a hard disk, a Blu-ray disk, a universal serial bus (USB), a memory card, a read-only memory (ROM), or the like.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the present disclosure.

What is claimed is:

1. A refrigerator comprising:
   a memory storing instructions; and
   a processor that executes the instructions to
      control a display to display an image obtained by photographing an inside of the refrigerator,
      in response to an object of a plurality of objects included in the displayed image being selected, generate a capture image of the selected object,
      in response to a command for generating a tag user interface (UI) for tagging the selected object being received, control the display to display an input UI for receiving information to be included in the tag UI,
      generate the tag UI based on the information being received by the input UI, and
      control the display to display the generated tag UI in association with the capture image.

2. The refrigerator as claimed in claim 1, wherein the processor executes the instructions to
   control the display to display a guide UI for adjusting a size of the capture image, and
   adjust the size of the capture image based on a command received by the guide UI.

3. The refrigerator as claimed in claim 1, wherein the input UI comprises a first region including the capture image and a second region for receiving the information to be included in the tag UI.

4. The refrigerator as claimed in claim 1, wherein the processor executes the instructions to perform control to, in response to an input for moving the input UI being received, move the input UI based on the input for moving the input UI.

5. The refrigerator as claimed in claim 4, wherein the processor executes the instructions to control the display to display the input UI in a semi-transparent state while the input UI is moving.

6. The refrigerator as claimed in claim 1, wherein the processor executes the instructions to control the display to display the generated tag UI overlapping the capture image, to thereby display the tag UI in association with the capture image.

7. A method comprising:
   by a processor of a refrigerator,
      displaying an image obtained by photographing an inside of the refrigerator;
      in response to an object of a plurality of objects included in the displayed image being selected, generating a capture image of the selected object;
      in response to a command for generating a tag user interface (UI) for tagging the selected object being received, displaying an input UI for receiving information to be included in the tag UI;
      generating the tag UI based on the information being received by the displayed input UI; and
      displaying the generated tag UI in association with the capture image.

8. The method as claimed in claim 7, further comprising:
   by the processor of the refrigerator,
   displaying a guide UI for adjusting a size of the capture image; and
   adjusting a size of the capture image based on a command received by the guide UI.

9. The method as claimed in claim 7, wherein the input UI comprises a first region including the capture image and a second region for receiving the information to be included in the tag UI.

10. The method as claimed in claim 7, further comprising:
    by the processor of the refrigerator,
    in response to an input for moving the displayed input UI being received, displaying movement of the displayed input UI based on the input for moving the displayed input UI.

11. The method as claimed in claim 10, wherein the input UI is displayed in a semi-transparent state while the input UI is moving.

12. The method as claimed in claim 7, wherein the generated tag UI is displayed overlapping the capture image, to thereby be displayed in association with the capture image.

13. The refrigerator as claimed in claim 1, further comprising the display.

14. The refrigerator as claimed in claim 1, wherein the information to be included in the tag UI includes text information.

15. The refrigerator as claimed in claim 1, wherein the information to be included in the tag UI includes an emoticon.

16. The method as claimed in claim 7, wherein the information to be included in the tag UI includes text information.

17. The method as claimed in claim 7, wherein the information to be included in the tag UI includes an emoticon.

* * * * *